United States Patent
Hirt

(10) Patent No.: US 6,755,089 B2
(45) Date of Patent: Jun. 29, 2004

(54) TORQUE TRANSFER DEVICE MORE PARTICULARLY WITH DOUBLE CLUTCH TRANSMISSION

(75) Inventor: Gunter Hirt, Kongsberg (NO)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 10/223,055

(22) Filed: Aug. 15, 2002

(65) Prior Publication Data

US 2003/0051577 A1 Mar. 20, 2003

Related U.S. Application Data

(63) Continuation of application No. PCT/DE01/00217, filed on Jan. 18, 2001.

(30) Foreign Application Priority Data

Feb. 15, 2000 (DE) .......................................... 100 06 562

(51) Int. Cl.[7] .......................... F16H 3/08; F16H 59/00; F16H 3/38
(52) U.S. Cl. .............................. 74/329; 74/335; 74/340
(58) Field of Search .......................... 74/329, 330, 331, 74/340, 356, 357, 360, 664, 665 A, 665 E, 665 F, 665 GA

(56) References Cited

U.S. PATENT DOCUMENTS

| 4,461,188 | A | * | 7/1984 | Fisher ........................ 74/330 |
| 4,527,678 | A | | 7/1985 | Pierce et al. |
| 5,030,179 | A | | 7/1991 | Ganoung |
| 5,150,628 | A | * | 9/1992 | Alfredsson ................... 74/330 |
| 5,186,065 | A | * | 2/1993 | Downs ............... 74/665 GA X |
| 5,950,781 | A | * | 9/1999 | Adamis et al. ........... 74/331 X |
| 6,209,407 | B1 | * | 4/2001 | Heinzel et al. ............... 74/331 |
| 6,250,171 | B1 | * | 6/2001 | Sperber et al. ............... 74/331 |

FOREIGN PATENT DOCUMENTS

| DE | 198 59 458 A1 | | 6/1999 | |
| DE | 199 24 501 A1 | | 12/2000 | |
| EP | 0 797 025 A1 | | 9/1997 | |
| JP | 58180859 | * | 10/1983 | .................. 74/356 |
| JP | 02146336 | * | 6/1990 | .................. 74/331 |
| JP | 03004057 | * | 1/1991 | .................. 74/360 |
| JP | 10026189 | * | 1/1998 | |

* cited by examiner

Primary Examiner—Roger Pang
(74) Attorney, Agent, or Firm—Darby & Darby

(57) ABSTRACT

The invention relates to a torque transmission device with at least a first, at least a second and at least a third shaft, whereby said torque transmission device comprises at least one drive mechanism which may be switched into different operating states.

39 Claims, 12 Drawing Sheets

TORQUE TRANSFER DEVICE MORE PARTICULARLY WITH DOUBLE CLUTCH TRANSMISSION

CROSS-REFERENCE TO RELATED APPLICATION

This is a continuation of international application Serial No. PCT/DE01/00217, filed Jan. 18, 2001, which is hereby incorporated by reference in its entirety.

TECHNICAL FIELD

The invention relates to a torque transfer device which has in particular a double clutch transmission.

BACKGROUND

A torque transfer device is already known which is designed as a double clutch transmission (see G. Lechner, H. Naunheimer; Vehicle transmissions; Berlin 1994). This double clutch transmission has a gear input shaft which is divided into a solid and a hollow shaft. Two drive trains are provided for the power flow. One clutch thereby serves the second and fourth gear and a second clutch serves the first and third gear. The gears of the relevant train which is not active can be preselected. Gear change is then carried out by changing over the coupling from one clutch to the other clutch.

The object of the invention is to provide a torque transfer device which has a different configuration.

According to a particular aspect the object of the invention is to provide a torque transfer device of a different configuration which has a double clutch transmission.

According to a further aspect the object of the invention is to provide a torque transfer device which has a structurally simple design and which can be manufactured cost-effectively and which, particularly when fitted in a motor vehicle ensures a good comfortable ride.

This is achieved through a torque transfer device which has at least one feature from those described in the following description or in the claims or are illustrated in the accompanying drawings.

The object of the invention is further achieved through a control device for controlling a torque transfer device which has at least one feature from the features described in the following description or claims or illustrated in the accompanying drawings.

The object is further achieved through a method for operating a torque transfer device which has at least one feature from the features described in the following description or claims or illustrated in the drawings.

The object is further achieved through a torque transfer device according to claim 1 or claim 2 or claim 4 or claim 6.

The object is further achieved through a control device for controlling a torque transfer device according to claim 4.

The object is further achieved through a method for operating a torque transfer device according to claim 5.

A torque transfer device according to the invention has at least a first, at least a second and at least a third shaft as well as a transmission device. The first and/or second and/or third shaft is at least in part a constituent part of the transmission device or is mounted outside of the transmission device.

A torque transfer device is in the sense of the present invention a device which can transfer torque and which can be shifted into different shift positions. Preferably a torque transfer device has in the sense of the present invention at least a clutch device as well as at least a transmission device.

A transmission device is in the sense of the present invention in particular a device which can be shifted into different shift positions stepped or continuously as well as with or without tractive force interruption by generating a different transmission ratio between two predetermined shafts. Controlling the shift processes of the transmission device can be undertaken automatically or manually or part-automatically or automatically with additional manual override facility or in some other way. Shift processes in the transmission device are controlled in particular electronically. It is particularly preferred if the transmission device is configured so that shifting between different transmission stages is possible without any interruption in the tractive force.

A transmission stage in the sense of the present invention is in particular component parts of a transmission device, such as toothed wheels which can cause torque to be transferred between two predetermined shafts.

According to the invention the transmission device has several different transmission stages of which one part can be shifted between the first shaft and third shaft and of which one part can be shifted between the second shaft and third shaft.

In these transmission stages torque is transferred directly or indirectly between the first and third shaft or between the second and third shaft.

It is also preferred if the torque between the first shaft and third shaft or between the second shaft and third shaft is transferred indirectly.

By direct transfer is meant in the sense of the present invention that torque from one shaft or a component part coupled rotationally secured thereto is introduced directly into the other shaft or a component part coupled rotationally secured to this shaft, without the interposition of any further components.

By indirect transfer of the torque is meant in the sense of the present invention that the torque is introduced from one shaft or a component part connected rotationally secured to this shaft into an intermediate component part or assembly of such components, and then the torque is passed from this intermediate component part to the other shaft or to a component part connected rotationally secured thereto.

The torque transfer can be carried out in the sense of the present invention through toothed wheels or contact means or in some other way. The spline of the toothed wheels is straight or inclined or designed in some other way. The toothed wheels can be in particular bevel wheels or spur wheels and internally or externally cogged wheels.

The torques can in particular also be transferred through friction wheels. According to the invention at least one transmission stage which can be shifted between the first and third shaft has the same transmission ratio as a transmission stage which can be shifted between the second shaft and third shaft.

One part of the transmission stages can be shifted between the first shaft and third shaft and one part of the transmission stages can be shifted between the second shaft and third shaft.

The transmission device is preferably configured so that the torque flow through the torque transfer device can flow through a transmission stage arranged between the first and second shaft or alternatively through a transmission stage arranged between the second and third shaft or both through a transmission stage arranged between the first shaft and third shaft as well as through a transmission stage arranged between the second shaft and third shaft.

This is further achieved through a torque transfer device according to claim 2.

A torque transfer device according to the invention has at least one first, at least one second and at least one third shaft, as well as a transmission device. The transmission device can be shifted into different shift positions. The transmission device furthermore has several transmission stages which differ at least in part through the transmission ratios which are or can be shifted in these transmission stages. A part of these transmission stages can be shifted between the first and third shaft and a part of these transmission stages can be shifted between the second and third shaft.

In a preferred embodiment of the invention a torque transfer device according to the invention is integrated in a vehicle which has a vehicle drive device which is preferably designed as an internal combustion engine and loads a crankshaft in a predetermined rotational direction. Several of the transmission stages are preferably designed so that with this rotational direction of the crankshaft in the different transmission stages the same rotational direction of the third shaft is effected each time whereby the transmission stages are preferably arranged in the torque flow between the crankshaft and third shaft or can be shifted into this torque flow.

The transmission stages are preferably designed so that with a rotational direction of the crankshaft which is preset through the vehicle drive device a rotational direction of the third shaft is produced which has the effect of driving the motor vehicle in the forward drive direction.

Where necessary at least a further transmission stage is configured so that under the predetermined conditions an opposite rotational direction of the third shaft is produced. It is particularly preferred if the torque transfer device according to the invention is disposed in a motor vehicle which has a vehicle drive device, crankshaft and at least a vehicle drive axle wherein the rotational direction of the crankshaft which is determined by the vehicle drive mechanism causes the opposite rotational direction of the third shaft which in turn causes the vehicle to be driven in the reverse drive direction.

It is particularly preferred if this change in the rotational direction is produced by a transmission stage between the first and third or between the second and third shaft being divided at least once into partial transmission ratios.

It is particularly preferred if the first rotational direction of the third shaft or the forward gears is/are produced so that the shift stages are designed as an assembly of toothed wheels wherein a toothed wheel connected rotationally secured to the first or second shaft engages directly into a toothed wheel connected to the third shaft in order to produce the first rotational direction of the third shaft. In order to produce the opposite rotational direction of the third shaft or rotational direction of the reverse gear an additional intermediate toothed wheel stage can be arranged between a toothed wheel mounted on the first or second shaft and a toothed wheel mounted on the third shaft.

The transmission stages which are arranged between the first and third or between the second and third shaft and produce a first rotational direction of the third shaft or produce a rotational direction of a drive axle of a motor vehicle which is designed so that the vehicle is driven in the forward drive direction, are numbered with a rising transmission ratio of the relevant transmission stage or with a rising overall transmission ratio of the overall transmission ratios dedicated to these relevant transmission stages, namely with a natural progressive sequence beginning with the number 1.

By the transmission ratio of the transmission stage is meant in this sense in particular the transmission ratio which is dedicated to a gear or transmission stage—where necessary divided into partial stages—which is arranged between the first shaft and third shaft or between the second shaft and the third shaft. By overall transmission ratio of the transmission train associated with this transmission stage is meant in particular the transmission ratio between the crankshaft of a motor vehicle and a predetermined drive axle of this motor vehicle, which is given when the predetermined transmission stage between the first shaft and third shaft or between the second shaft and third shaft is shifted.

The gears of a motor vehicle correspond in particular to the natural numbers associated with these transmission stages.

According to the invention at least one transmission stage can be shifted between the first shaft and the third shaft and/or between the second shaft and the third shaft which is designated with an even number as well as at least one transmission stage which is designated with an odd number.

According to a preferred embodiment of the invention torque is transferred from the transmission device when a shift is made between the different shift or transmission stages of the transmission device so that a gear change is possible under load.

The object of the invention is further achieved through a torque transfer device according to claim 4.

According to the invention a torque transfer device has several shafts of which at least one is a third shaft and at least one is a fourth shaft. Preferably the fourth shaft is an input shaft, such as for example an input shaft of the torque transfer device or a gear input shaft and the third shaft is an output shaft such as for example a gear output shaft or an output shaft of the torque transfer device or a drive axle of a motor vehicle. A transmission device is under predetermined conditions arranged at least in part in the transmission stretch between the third and fourth shaft and can be shifted into different shift positions. At least one part of these shift positions differs in that the transmission ratio between the third and fourth shaft is different. During a shift process between different shift positions or different transmission stages torque can be transferred between the third shaft and fourth shaft. In at least two different shift positions the shifted transmission ratio between the third and fourth shaft is identical. It is also preferred if several groups of the shift positions each have an identical transmission ratio of the transmission device although this is different between the groups.

Preferably at least one of the shafts is a first shaft and at least one of the shafts is a second shaft and at least one of the shafts is a third shaft wherein the transmission device can be shifted into different shift positions and wherein in these different shift positions different transmission stages are given at least in part and wherein a part of these transmission stages can be shifted between the first and third shaft and a part of these transmission stages can be shifted between the second and third shaft.

The object of the invention is further achieved through a torque transfer device according to claim 6.

According to the invention a torque transfer device is provided with at least a first, at least a second and at least a third shaft which furthermore has a transmission device. The transmission device can be shifted into different shift positions and has several different transmission stages. A part of these transmission stages can be shifted between a first shaft and third shaft and a part of these transmission stages can be shifted between the second shaft and third shaft. The transmission stages are numbered with continuous natural numbers in the direction of a rising transmission ratio or overall transmission ratio. The transmission device is furthermore designed so that from at least one predetermined transmission stage between the first and the third or between the second and the third shaft which is associated in particular with a predetermined gear of the motor vehicle it is possible to shift into the transmission stages which are provided with the next two higher numbers and/or to shift into the transmission stages which are marked with the next two lower numbers whereby here the torque transfer device transfers torque during these shift processes, thus in particular torque is transferred from a crankshaft of a motor vehicle with torque transfer device to the drive axles of this vehicle when shifting over between these different gears. It is also particularly preferred that it is possible to change gear from one gear into the next three higher and/or lower gears or to change into the next four higher and/or next four lower gears.

According to the invention several first and several second shafts are provided whereby if necessary intermediate shafts are switched in between these first and second shafts and the third shaft.

By shifting into the next two, three or four higher or lower gear stages is to mean in particular that any one of these gear stages can be selected in which to make the shift, namely without any break in the tractive force in the drive train.

Preferably the torque transfer device or transmission device has six forward gears as well as one reverse gear wherein transmission stages which are arranged between the first and third shaft are allocated to the first, third, fourth as well as sixth forward gears, and wherein transmission stages which are arranged between the second shaft and third shaft are dedicated to the reverse gear, second gear, fourth gear as well as fifth gear.

In this embodiment by way of example fourth gear is preferably arranged both between the first and third shaft as well as also between the second and third shaft.

In the event where it is only possible to shift to and fro between transmission stages which are associated with different pairs of shafts without a break in the tractive force, it now becomes possible to shift from second gear into third gear as well as fourth gear, thus into the two next successive higher gears and furthermore from third gear into fourth gear as well as fifth gear, thus likewise into two successive next higher gear stages. Naming the shift stages here by way of example is not to restrict the invention.

Particularly in the case where further first and further second shafts are provided and a number of transmission ratios each allocated to predetermined gears can be shifted in multiple manner, thus in different shift positions of the transmission device, shift processes can be undertaken into any next higher or any next lower gear stages whereby during these shift processes the tractive force in the drive train is not interrupted. It is also preferred if several transmission ratios or overall transmission ratios which are associated with the transmission stages between the first shaft and third shaft can likewise be shifted into transmission stages between the second shaft and third shaft. In a particularly preferred embodiment each shiftable gear can be engaged both by shifting a corresponding transmission stage between the first and third shaft and also by shifting a corresponding transmission stage between the second shaft and third shaft so that in this preferred embodiment it is possible to shift from any one gear into any other gear.

According to a particularly preferred embodiment of the invention the transmission device or the torque transfer device is controlled electronically.

Preferably the torque transfer device has at least one clutch device, preferably at least a first and at least a second clutch device. Particularly preferred the torque transfer device has where necessary as an addition, at least a third clutch device. The clutch devices are designed with or without a power branch and can transfer torque through friction engagement, through keyed engagement or in some other way. Preferably in particular the first and second clutch device are friction clutches which have two or more friction faces. More particularly the first and second clutch device are a multi-plate or other friction clutch and the third clutch devices are claw clutches.

The clutch devices can be designed with or without synchronising devices. The synchronising device enables in particular when coupling two rotatably mounted parts to adapt the speeds of these parts prior to coupling. The clutch devices can be formed as wet-running or dry clutches. It is particularly preferred if the first and second clutch device is formed as a wet-running multi-plate clutch or as a dry friction clutch.

The clutch devices are self-adjusting or non-self-adjusting and have where necessary a spring or damper or spring-damper device. This spring or damper or spring-damper device is preferably coupled to the friction linings of a friction clutch.

Preferably at least one wheel is mounted about the axis of the first and/or second and/or third and/or fourth shaft or input shaft and/or output shaft. Particularly preferably this wheel can, if necessary in combination with wheels which are mounted on others through the shafts, be used to transfer torque.

At least one part of these wheels is preferably designed as an externally toothed or internally toothed spur wheel or as a bevel wheel or as a hypoid wheel or as a helical wheel or as a worm wheel or as a friction wheel. The term of friction wheel in the sense of the present invention is to be widely interpreted and includes in particular friction wheels which are designed so that they transfer torque through direct engagement in one or more further friction wheels, or that they transfer torque through contact means.

It is also preferred if torque is transferred between toothed wheels through contact means.

A preferred transmission device has several third clutch devices.

It is particularly preferred if these third clutch devices are at least in part arranged or configured so that they are each associated at least with one transmission stage which is arranged between the first and third shaft and between the second and third shaft respectively and that they can cause torque to be transferred from the first shaft through the relevant transmission stage to the third shaft or vice versa or render torque transfer impossible. The third clutch devices are preferably arranged in the region of the second and third shaft. Preferably the third clutch devices are formed as a claw clutch and have in a particularly preferred manner a synchronisation device. This synchronisation device has in particular synchronisation rings. By means of the third clutch device it is possible to produce or release a rotationally secured connection between a toothed wheel mounted on the first shaft and the first shaft itself, or between a toothed wheel mounted on the second shaft to create or release a rotationally secured connection of this toothed wheel with the second shaft, whereby the clutch device is here shifted in different shift positions.

More particularly the toothed wheels of these transmission stages more particularly allocated to the gears which (toothed wheels) are mounted on the first and second shaft, are mounted rotatable on the relevant shafts and can be connected rotationally secured to the relevant shaft through the dedicated third clutch device.

It is particularly preferred if at least one of the third clutch devices can connect several wheels mounted on the first and second shaft rotationally secured to the relevant shaft or can release this connection. Preferably this relevant clutch device is however designed so that at the same time there is always one of the wheels which can be coupled to the relevant shaft actually connected secured against rotation with the said shaft.

Preferably the transmission device of the torque transfer device can be shifted into n transmission stages or gears wherein (n−m) third clutch devices are provided and where n and m are each natural numbers. Thus preferably m=(n+1)/2 when n is an odd number, and m=(n+2)/2 when n is an even number. The transmission device can particularly preferably be shifted into eight transmission stages or gears wherein n third clutch devices are provided. Preferably the transmission device can be shifted into several transmission stages or gears wherein four third clutch devices are likewise provided. The eight gears are thereby in particular six different forward drive gears, one reverse gear as well as a further forward gear which is identical with one of the six forward gears. BY way of example two fourth forward gears are provided. The seven gears are in particular five forward gears, one reverse gear, as well as a gear which is identical with one of the five forward gears. The invention is however not restricted to these special gears. It is possible to provide several reverse gears or less than five or more than six forward gears. Furthermore it is preferred that not only can one transmission stage or gear be engaged repeatedly, thus different shift positions of the transmission device are provided in which the same gear is engaged each time, but several gears can be provided twice.

According to a particularly preferred embodiment of the invention the first and/or second and/or third clutch devices are each actuated or shifted by an actuating device. The actuating devices of the third clutch device can be configured so that each one actuating device is provided for each one transmission stage or each one gear, or that several gears or transmission stages can be actuated by each one actuating device. Preferably the actuating devices have a drive device or are coupled to a drive device. The drive devices and actuating devices can be configured each time hydraulically and/or pneumatically and/or electrically and/or electromechanically or only mechanically or in some other way.

Within the sense of the present invention the actuating devices which actuate first clutch devices as well as the associated drive devices are designated in particular first actuating devices or drive devices whilst the actuating device or associated drive device of the second clutch device are designated in particular second drive or actuating devices and whilst the actuating devices or associated drive devices of the third clutch devices are designated in particular as third drive or actuating devices.

The transfer section between these relevant drive devices and these relevant clutch devices can be designed with at least one or without any transmission stage. It is further preferred if a transmission stage is provided inside at least one of these drive devices.

According to a particularly preferred embodiment of the invention the torque transfer device has at least two third clutch devices which can each be loaded by a third or common drive device wherein the relevant signal transfer stretches between this or these third drive devices and the associated third clutch devices for these third clutches is in part identical. This is achieved in particular in that for the transfer of the signal sent from the relevant third drive device to the relevant third clutch device the same component parts are used at least in part and/or that these component parts are loaded in the same way during loading of these different third clutch devices.

Preferably a shift shaft is provided in the signal transfer stretch between two different third clutches and the associated third drive devices, wherein this shift shaft can be loaded in rotation by one of the third drive devices and in translation by another of the third drive devices. It is thereby particularly preferred if through shifting of the shift shaft in the translation direction it is possible to determine which of the third clutch devices is to be engaged or disengaged and through rotation movement of this shift shaft it is possible to carry out the corresponding engagement and disengagement respectively.

There is thus in particular a so-called shift and a so-called selection movement carried out.

A particularly preferred arrangement of this kind has the function of shifting and selecting for the third clutch devices of the first shaft and such an arrangement for the third clutch devices of the second shaft.

According to a preferred embodiment of the invention several third clutch devices are provided which each have for each drive device a signal transfer stretch provided solely for this third clutch device so that this signal transfer stretch or its component parts are not used by several third clutch devices or for shifting these third clutch devices.

Preferably the third clutch devices which are associated with the first shaft can preferably be shifted independently of the third clutch devices which are associated with the second shaft. Particularly preferably in the case where several first shafts are provided the clutch devices associated with these first shafts can be shifted independently of the clutch devices of other first shafts or other second shafts.

The same preferably applies to the case where several second shafts are provided.

Preferably for each third clutch device there is a third drive device. Preferably at least one of the third actuating devices has a shift roller.

By shift roller in the sense of the present invention is meant in particular a component part which can be loaded by a drive device and which has a profiling by means of which an automatic control is effected. Particularly preferably the shift roller is loaded in rotation or translation by a drive device, such as an electric motor wherein the shift roller is formed substantially as a cylindrical body with profiled indentations arranged on the outer circumference in which several shift forks or the like engage. The shift forks furthermore engage in the clutch device, more particularly the third clutch devices. The individual third clutch devices can be actuated by means of such automatic guidance or shift shaft, namely so that it is ensured that several gear stages with different transmission ratio cannot all be shifted at the same time.

One shift roller is preferably provided for the or each first shaft and for the or each second shaft and for the third clutch devices associated with these shafts.

According to a particularly preferred embodiment of the torque transfer device according to the invention at least one wheel mounted about the axis of the first shaft as well as at least one wheel mounted about the axis of the second shaft acts on a same wheel which is mounted about the axis of the third shaft whereby particularly the wheel mounted about the first and second shaft can be coupled rotationally secured to this relevant shaft or can be uncoupled from this shaft.

Each transmission stage between the first and third shaft or between the second and third shaft is configured by means of these wheels. The transmission ratios between the first shaft and the third shaft or between the second shaft and the third shaft which can be shifted by using this wheel of the third shaft which is used for torque transfer by both the first and the second shaft can be identical or different. In a particularly preferred embodiment torque can be transferred to several wheels extending round the axis of the third shaft both from the first shaft and from the second shaft. In a particularly preferred way a wheel mounted on the third shaft can be used on the one hand to shift a first gear, and on the other hand to shift the reverse gear. According to a preferred embodiment of the invention a predetermined gear, such as fourth gear, can be engaged by means of a wheel of the third shaft and a wheel of the first shaft or by means of this wheel of the third shaft and a wheel of the second shaft. It is particularly preferred if when this gear is shifted the torque is transferred both between the second and third shaft and between the first and third shaft whereby the first and second clutch are completely closed at least at times.

In a particularly preferred embodiment torque can be transferred to at least one wheel of the third shaft by means of a wheel of the first shaft during a first time window and by means of a wheel of the second shaft during a second time window which is different from the first.

The clutch device according to the invention is preferably designed so that under predetermined conditions torque can be transferred to the third shaft both from the first shaft and from the second shaft whereby torque is introduced from the first shaft into the third shaft by means of a wheel of the third shaft and whereby torque is introduced from the second shaft into the third shaft by means of another wheel of the third shaft which is different from the aforesaid wheel. These torques of the first and second shaft can thereby be produced by the same drive device, and more particularly are transferred through the crankshaft of a motor vehicle having a torque transfer device according to the invention to this first shaft as well as to the second shaft wherein a clutch device is disposed each time in the torque flow between the crankshaft and the first shaft as well as in the torque flow between the crankshaft and the second shaft, and wherein it is particularly preferred if the torque is transferred to the first shaft by means of a first clutch device and the torque is transferred to the second shaft by means of a second clutch device.

According to a preferred embodiment of the invention the first clutch device as well as the second clutch device have a common clutch housing. According to a particularly preferred embodiment of the invention the first clutch device is configured so that in at least one first shift position it transfers torque between a fifth shaft and a sixth shaft and in at least a second shift position it is opened so that it can transfer no torque between these shafts. In a particularly preferred embodiment this first clutch device can furthermore be shifted into at least a third shift position in which it can transfer a predetermined restricted torque between the fifth and the sixth shaft. More particularly the first clutch device is designed as a friction clutch so that where the adjoining torque which is to be transferred is greater than the predetermined torque the clutch slips.

The fifth shaft is in particular a crankshaft of a motor vehicle and the sixth shaft is in particular a first or a second or a fourth shaft or an input shaft, such as a gear input shaft.

According to a particularly preferred embodiment of the invention at least a part of the second clutch device is mounted rotationally movable relative to the first clutch device under predetermined conditions wherein the second clutch device is mounted in particular rotationally movable on the sixth shaft. This is particularly achieved in that the output part of the first clutch device facing the output side is connected substantially rotationally secured to the sixth shaft about which the output part of the second clutch device extends rotationally movable and where necessary concentric. This output part of the second clutch device is preferably coupled substantially rotationally secured to a wheel. The sixth shaft is preferably coupled rotationally secured to a wheel.

Torque is transferred to the first shaft and second shaft through these dedicated wheels.

The second clutch device preferably transfers torque between a seventh shaft and an eighth shaft in at least one first shift position of this second clutch device, and in at least a second shift position interrupts this torque flow through the second clutch device. In a particularly preferred embodiment the second clutch device can furthermore be shifted into at least one third shift position in which it can transfer a predetermined restricted torque. The second clutch device is preferably designed for this purpose as a friction clutch device wherein on exceeding this predetermined torque the clutch slips.

The seventh shaft is in particular the fifth shaft or the crankshaft of a motor vehicle or a component part coupled rotationally secured to this crankshaft. The eighth shaft is in particular one of the first or one of the second or the fourth shaft.

Preferably the first and/or second clutch device is mounted in the torque flow between the crankshaft of a motor vehicle equipped with the transfer device and the first or second shaft.

The first and/or second clutch device is preferably mounted in the torque flow between the first or second shaft and a drive axle of a motor vehicle.

According to a particularly preferred embodiment of the invention under predetermined conditions the first as well as the second clutch device transfer at the same time a torque which is transferred in particular to the first shaft and to the second shaft. Preferably the limit torque transferable by the first clutch device or the second clutch device is thereby preferably restricted to a predetermined value.

Preferably the torque transfer device according to the invention has a control device which according to a predetermined characteristic controls the shift positions of the first and second clutch device. Preferably this control device furthermore controls the third clutch devices and where necessary further shift processes or the like.

According to a particularly preferred embodiment of the invention under predetermined conditions the first clutch device and the second clutch device are shifted at least at times simultaneously wherein in particular one of these clutch devices becomes increasingly opened and the other of these clutch devices becomes increasingly closed. According to the invention it is proposed in particular that under predetermined conditions the first and the second clutch device are shifted in the sense of an overlapping shift. Preferably at the beginning of the overlapping shift one of these two clutch devices is completely closed whilst the other of these clutch devices is completely opened. The one clutch device becomes increasingly opened whilst the other becomes increasingly closed so that increasing torque is transferred through the other clutch device and the torque transfer through the one clutch is broken down. At the end of this overlapping shift the other clutch device is completely closed and the one clutch device is completely opened. It is hereby particularly possible to shift from one engaged gear whose transmission stage is arranged between the first and third shaft, under load into a gear whose transmission stage is arranged between the second shaft and third shaft. The torque transfer device can during the entire shift processes between the gears transfer torque from the crankshaft of a vehicle having a torque transfer device to a drive axle of this vehicle, or vice versa.

In the sense of the present invention the third shaft is in particular an input shaft such as input shaft of the torque transfer device or gear device, an output shaft, such as output shaft of the torque transfer device or transmission device.

In the sense of the present invention the fourth shaft is in particular an input shaft such as input shaft of the torque transfer device or the transmission device, or an output shaft such as output shaft of the torque transfer device or transmission device.

According to a particularly preferred embodiment of the invention this torque transfer device has at least a fourth clutch device.

The first and/or second and/or fourth clutch device are formed preferably as a start-up clutch.

Particularly preferred the torque transfer device has a first, a second, several third and one fourth clutch device. Particularly preferred the fourth clutch device is formed as a start-up clutch wherein an input part of this fourth clutch device is coupled rotationally secured to the crankshaft of a motor vehicle.

The third clutch devices are associated with the transmission stage of the transmission device and are preferably designed as already described above.

The first and second clutch device which are each preferably formed as a multi-plate clutch can couple and uncouple the first shaft and a fourth shaft or output shaft or the second shaft and a fourth shaft or output shaft. The transmission stages of the transmission device are preferably arranged between a third shaft and the first shaft or between the third shaft and the second shaft. The third shaft is in particular a gear input shaft.

The object of the invention is further achieved through a control device for controlling a torque transfer device according to claim 4.

The object is further achieved through a method according to claim 5.

By the term "control" is meant in the sense of the present invention in particular "regulate" and/or "control" in the sense of the DIN. The same applies to the terms derived from the term "control".

The patent claims filed with the application are proposed wordings without prejudice for obtaining wider patent protection. The applicant retains the right to claim further features disclosed up until now only in the description and/or drawings.

References used in the sub-claims refer to further designs of the subject of the main claim through the features of each relevant sub-claim; they are not to be regarded as dispensing with obtaining an independent subject protection for the features of the sub-claims referred to.

Since the subjects of the sub-claims can form independent and proper inventions in respect of the prior art known on the priority date the applicant reserves the right to make them the subject of independent claims and partial declarations. They can also contain independent inventions which have a configuration independent of the subjects of the preceding sub-claims.

The embodiments are not to be regarded as a restriction of the invention. Rather within the scope of the present disclosure numerous modifications and amendments are possible, particularly those variations, elements and combinations and/or materials which e.g. through a combination or modification of individual features or elements or method steps described in connection with the general description and embodiments as well as claims and are contained in the drawings can be drawn on by the expert with a view to solving the problem posed by the invention and which through a combination of features lead to a new subject or new method steps or sequence of method steps, where they relate to manufacturing, test and work processes.

The invention will now be explained in further detail with reference to the embodiments which are not restricting and are given by way of example.

IN THE DRAWINGS

Figure 1:
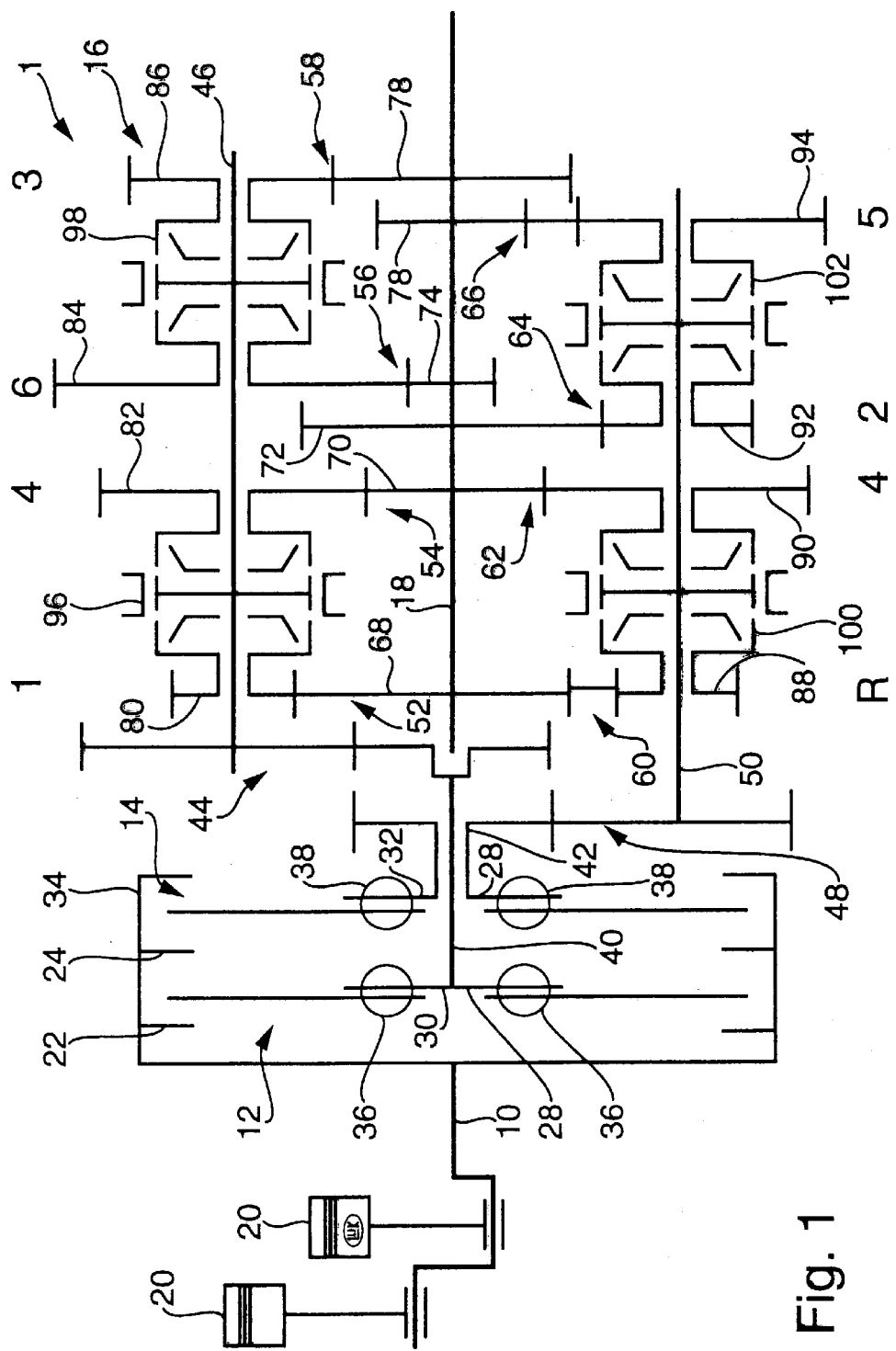
FIG. 1 shows a first diagrammatic part sectional view of a torque transfer device according to the invention.

FIG. 1 shows a first embodiment given by way of example of a torque transfer device 1 according to the invention. The torque transfer device 1 has a part of an input shaft 10 of the torque transfer device, a first clutch device 12, a second clutch device 14, a transmission device 16 as well as an output shaft 18 which is formed at the same time as the output shaft of the transmission device 16.

The input shaft 10 of the torque transfer device 1 is here shown as a crankshaft of a motor vehicle which is loaded by the cylinders 20 of a motor vehicle. The cylinders 20 are in particular the cylinders of a motor vehicle drive device such as an internal combustion engine.

The first clutch 12 as well as the second clutch device 14 are each configured as friction clutches and in particular each have a stop 22, 24, a clutch disc as well as a contact pressure plate. Furthermore the clutch devices 12, 14 have a common housing 34. This common housing is coupled on the drive side of the clutch devices 12, 14 rotationally secured to the input shaft 10 of the torque transfer device 1. By drive side is meant the side which inside the drive train faces the vehicle drive device whilst by output side is meant the side which inside the drive train faces the drive axle of the motor vehicle.

The first clutch device 12 is mounted on the drive side of the second clutch device 14. The first clutch device 12 as well as the second clutch device 14 each have a spring-damper mechanism 36, 38. The spring-damper mechanism 36, 38 is mounted substantially in the circumferential direction relative to the stop 22, 24 or to the clutch disc or to the contact pressure plate, and each preferably has a number of spring elements which are spaced out circumferentially relative to each other.

The output part 30 of the first clutch device 12 is connected rotationally secured to the first gear input shaft 40, and the output part 32 of the second clutch device is coupled rotationally secured to a second gear input shaft 42 which is a hollow shaft. More particularly the second gear input shaft 42 can be designed very short in the axial direction.

The first gear input shaft 40 is coupled to the first shaft 46 through a transmission stage 44 through which translation is made into underdrive, and the second gear input shaft 42 is coupled to the second shaft 50 through a transmission stage 48 through which translation is made into underdrive so that torque can be transferred from the first gear input shaft 40 to the first shaft 64 and from the second gear input shaft 42 to the second shaft 50.

In the embodiment according to FIG. 1 the transmission ratios of the transmission stages 44, 48 are the same. Furthermore with the same rotational direction on the input side the same rotational direction on the output side is produced through these transmission stages 44, 48.

The transmission stage 44 and/or the transmission stage 48 can however also be formed, but not shown in FIG. 1, so that the relevant transmission stage 44 or 48 is moved into overdrive or 1:1. Furthermore the transmission stages 44, 48 can be formed so that the transmission ratios of these transmission stages 44, 48 are different. Furthermore, although likewise not shown in FIG. 1, the transmission stages 44, 48 can be formed so that when the input rotational direction is the same they produce a different output rotational direction.

In FIG. 1 the transmission stages 44, 48 are each shown as a pair of toothed wheels. The transmission stages 44, 48 can however also each be designed so that the transmission ratio between the first gear input shaft 40 and the first shaft 46 or the second gear input shaft 42 and the second shaft 50 is produced through an arrangement of several interengaging toothed wheels or by means of contact means or by means of friction wheels or in some other way.

Between the first shaft 46 and the third shaft 18 there are four transmission stages, or four transmission stages can be connected, namely the transmission stages 52, 54, 56, 58. Between the second shaft 50 and the third shaft 18 there can be four transmission stages connected in or four transmissions stages are arranged, namely the transmission stages 60,62, 64, 66.

The transmission stages are here produced through pairs of toothed wheels or an arrangement of several toothed wheels. The transmission stages can however also be formed in another way.

When the first shaft 46 and second shaft 50 rotate in the same direction the transmission stages 52, 54, 56, 58, 62, 64, 66 produce the same rotational direction of the third shaft 18 which is achieved here in that the transmission stages are each formed by a pair of toothed wheels. These transmission stages 52, 54, 56, 58, 62, 64, 66 are, starting with one, numbered in the direction of rising transmission ratio with natural numbers. These natural numbers correspond in particular to the numbering of the forward gears which can be shifted with the torque transfer device 1 or the transmission device 16. In the illustration according to FIG. 1 the transmission stage 52 is dedicated to first gear, the transmission stage 64 to second gear, the transmission stage 58 to third gear, the transmission stages 54 and 62 each to fourth gear, the transmission stage 66 to fifth gear and the transmission stage 56 to sixth gear.

The transmission stage 60 has three interengaging toothed wheels of which a first is mounted on the second shaft 50, a second is mounted on an intermediate shaft and a third is mounted on the third shaft 18 whereby in respect of forward gears with the same rotational direction of the second shaft 50 the rotational direction of the third shaft 18 is reversed. The transmission stage 60 is dedicated to reverse gear. FIG. 1 shows only one transmission stage 60 which is dedicated to reverse gear. However there can be several transmission stages to which reverse gear is associated.

The numbering of the gears is in FIG. 1 only determined by the transmission ratios of the transmission stages 52, 54, 56, 58, 62, 64, 66 since in FIG. 1 no further transmission stages are provided in the drive train which have the effect that when the clutch devices are closed and the input shaft 10 has the same rotational speed a different speed is produced for the first shaft 46 or second shaft 50. In particular the sequence of the transmission stages 52, 54, 56, 58, 62, 64, 68 which are listed in size corresponds to the sequence of the overall transmission ratio listed in size between the input shaft 10 and the third shaft 18 or, but not shown here, a predetermined drive axle of a motor vehicle having the torque transfer device 1. Where necessary when numbering the gears further transmission stages would be taken into consideration if they have any influence on the relevant overall transmission ratios between the crankshaft 18 and a drive axle (not shown) of the vehicle.

It should be pointed out that seen in the direction of the drive train, other arrangements of these transmission stages are also preferred.

The transmission stage 52 of the first gear has a toothed wheel 68 mounted rotationally secured on the third shaft 18 and through which the third shaft 18 can likewise be loaded when the transmission stage 60 of the reverse gear is shifted or engaged so that a transmission stage 52 of the first shaft and a transmission stage 60 of the second shaft each act on the same toothed wheel 68 of the third shaft 18.

The toothed wheel 70 mounted rotationally secured on the third shaft 18 is loaded both when the transmission stage 54 of the fourth gear arranged between the first shaft 46 and third shaft 18 is engaged or shifted, and when the transmission stage 62 of the transmission stage 62 of fourth gear arranged between the second shaft 50 and the third shaft 18 is engaged. The toothed wheels 72, 74, 76, 78 are each only associated with one transmission stage 64, 56, 66, 58. The toothed wheels 80, 82, 84, 86 of the first, fourth, sixth and third gear respectively are mounted rotatable on the first shaft 46.

The toothed wheels 88, 90, 92, 94 are mounted rotatable on the second shaft 50.

Through the third clutch device 96 which is formed as a claw clutch with synchronising device, it is possible to shift into first gear or fourth gear. A rotationally secured connection is hereby produced between the first shaft 46 and the toothed wheel 80 of first gear or the first shaft 46 and the toothed wheel 82 of the fourth gear. The third clutch device is mounted on the first shaft 46 between the toothed wheel 80 of first gear and the toothed wheel 82 of the fourth gear.

In a corresponding way it is possible to engage sixth or third gear by means of the clutch device 98, reverse gear or fourth gear by means of the third clutch device 100, and second gear or fifth gear by means of the third clutch device 102. The third clutch devices 96, 98 can be shifted independently of the third clutch devices 100, 102.

One aspect of the functioning of the torque transfer device 1 according to FIG. 1 will now be explained in further detail.

In this respect, first some aspects of a shift process will be explained where a shift is to be made between a transmission stage 52, 54, 56, 58 which is mounted between the first shaft 46 and third shaft 18, and a transmission stage 60, 62, 64, 66 which is mounted between the second shaft 50 and the third shaft 18, or vice versa. This will now be explained below with reference to shifting from second gear to third gear:

Firstly second gear is engaged whereby the third clutch device 102 produces a rotationally secured connection between the toothed wheel 92 and the second clutch 50, and whereby the second clutch device 14 is closed and thus torque is transferred. The first clutch device 12 is substantially open and the third clutch devices 96, 98, 100 are substantially completely closed so that they do not produce a rotationally secured connection between a toothed wheel of a transmission stage and the first shaft 46. Torque is hereby transferred from the direction of the vehicle drive direction through the input shaft 10, the second clutch device 14, the hollow shaft 42 and the transmission stage 48 to the second shaft 50 from which torque is directed through the third clutch device 102, as well as the transmission stage 64 to the third shaft 18, and from here in particular to the drive axles of the vehicle.

When a shift is to be made into third gear, particularly when the first clutch device 12 is opened and by means of the synchronising device or the synchronising rings of the third clutch device 68, the speed of the first shaft 46 is adapted to or synchronised with the speed of the toothed wheel 68 of the transmission stage 58 of the third gear. As soon as the first shaft 46 and the toothed wheel 86 reach the same speed the claw clutch of the third clutch device 98 is closed so that the first shaft 46 is connected substantially rotationally secured to the toothed wheel 86 of the transmission stage 58 of third gear.

By closing the third clutch device the first shaft 46 is then rotated and the first clutch device 12 is however initially still open. The first clutch device 12 then becomes increasingly closed whereby the second clutch device 14 becomes increasingly opened. The effect of this is in particular that the part of the torque which as described above is transferred from the input shaft 10 through the second shaft 50 to the third shaft 18 decreases and instead increasing torque is transferred through the input shaft 10, the first clutch device 12, the first gear input shaft 40 and the transmission stage 44 to the first shaft 46 and from there is passed further through the clutch device 98 and the transmission stage 58 of the third gear to the third shaft 18.

As soon as substantially the entire torque introduced from the input shaft 10 of the torque transfer device is transferred through the first clutch device 12, the second clutch device 1 is completely opened. Now the first clutch device 12 synchronises the input shaft 10 and the combustion engine to the speed of the new gear. This transfer from one of the clutch devices 12, 14 to the other of same 12, 14 is called an overlapping shift. During the entire shift or overlapping shift the entire torque introduced from the input shaft 10 of the torque transfer device into the torque transfer device 1 is transferred from this torque transfer device 1 to the output side so that a power shift is provided.

In the illustration according to FIG. 1 however not only can a shift be made from second gear to the next higher gear, here third gear, but also it is possible to shift from second gear directly into fourth gear wherein with these relevant shift processes the torque transfer device 1 transfers torque.

Figure 2:
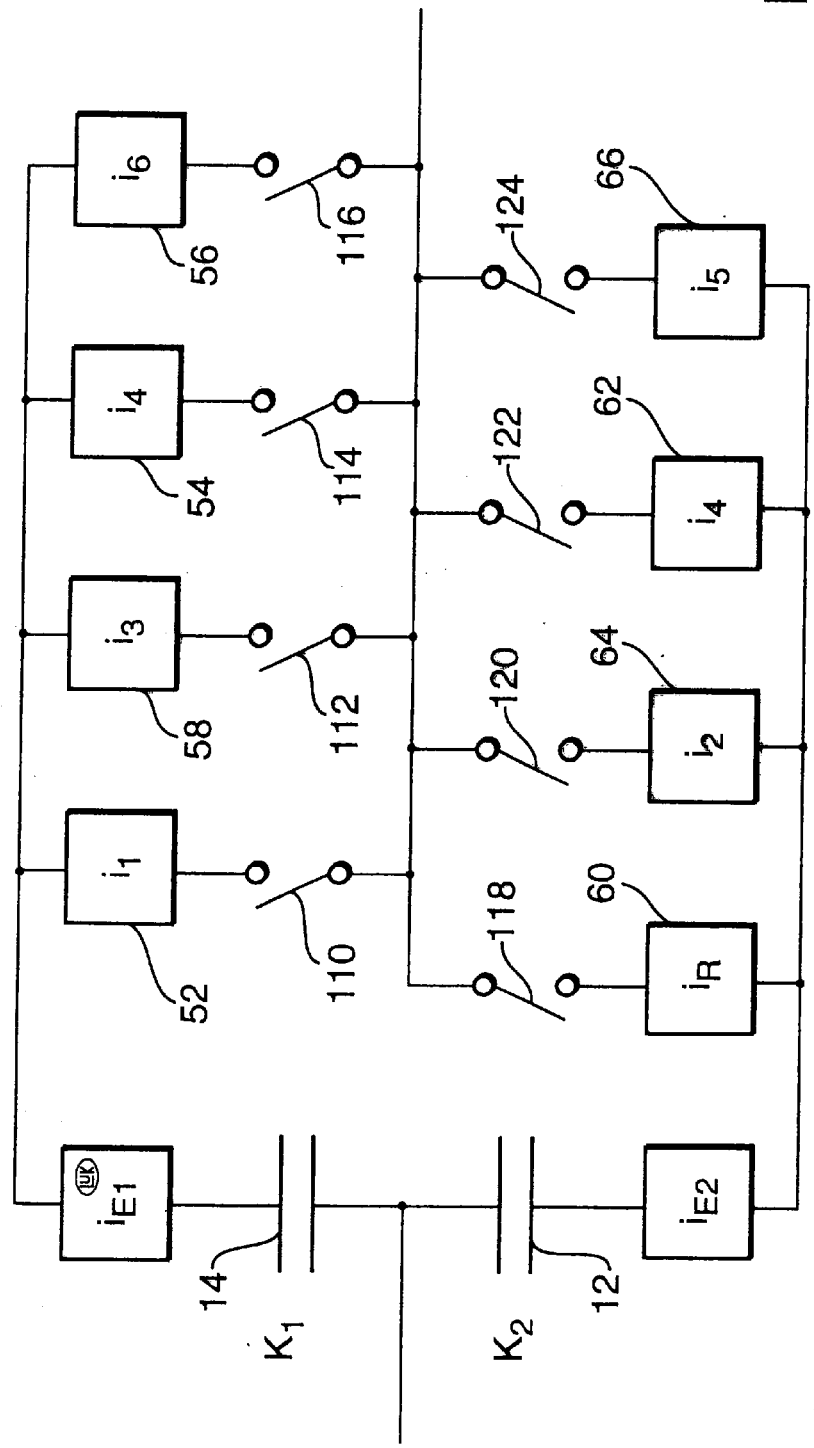
FIG. 2 shows a simplified view of FIG. 1.

FIG. 2 shows the torque transfer in a simplified view in which the third clutch devices 110, 112, 114, 116, 118, 120, 122, 124 are each arranged on the output side of the transmission stages 52, 54, 56, 58, 60, 62, 64, 66 so that here in particular the toothed wheels of the aforesaid transmission stages mounted on the third shaft can be coupled to or uncoupled from the said third shaft.

Figure 3:
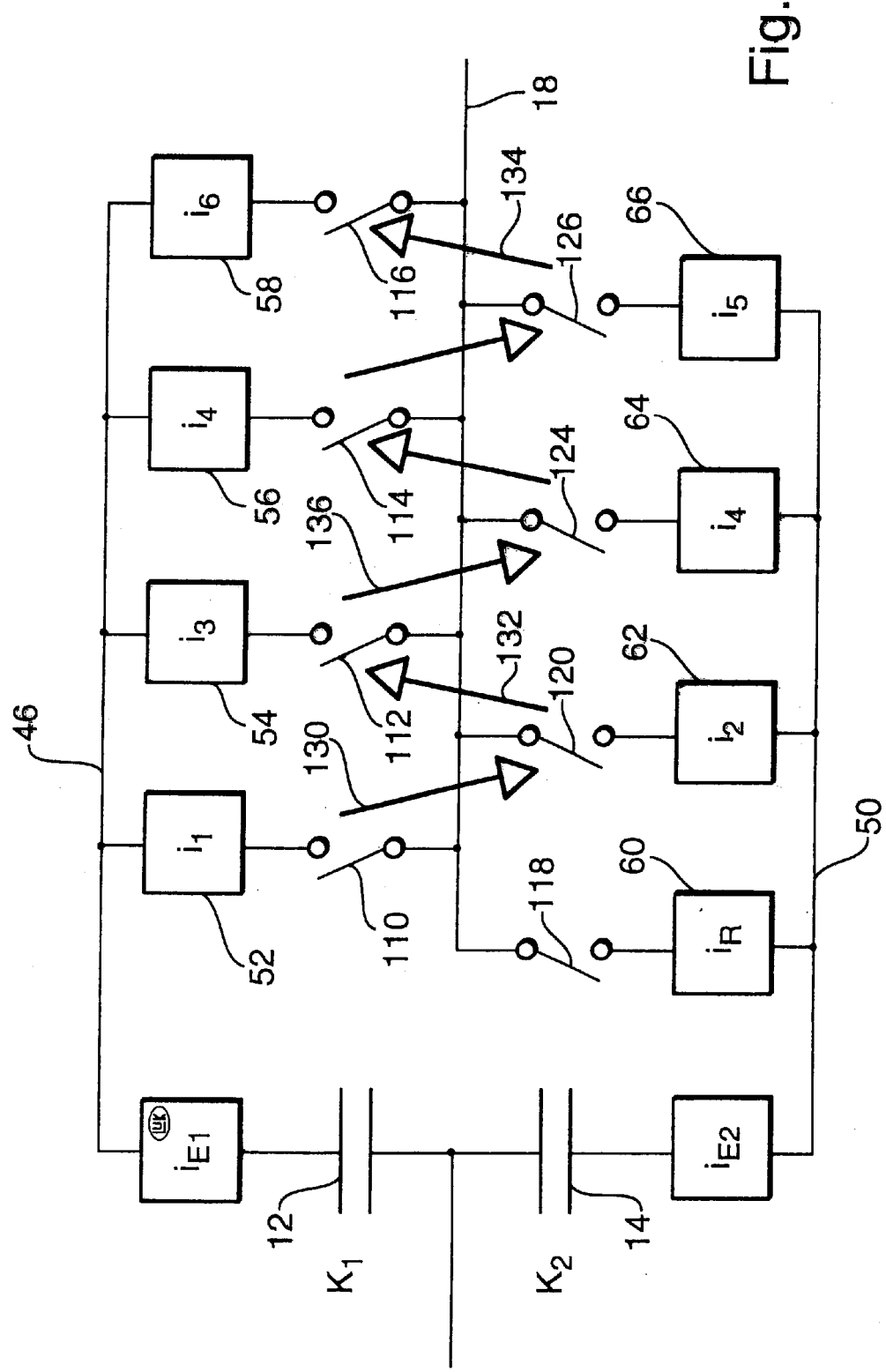
FIG. 3 shows a view in which examples of shift processes are symbolised with respect to FIG. 2.
Figure 4:
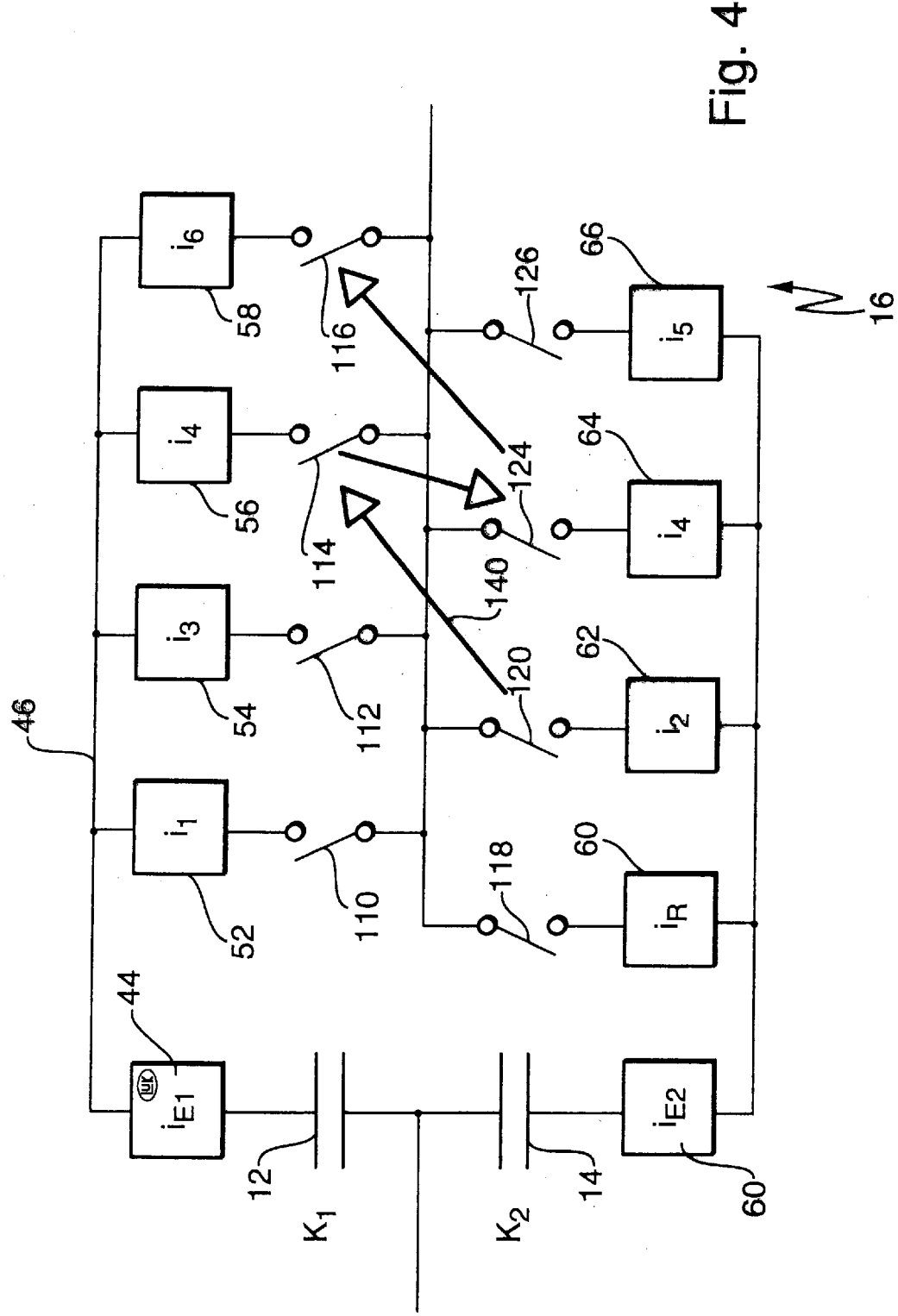
FIG. 4 shows a second view in which examples of shift processes are symbolised with respect to FIG. 2.
Figure 5:
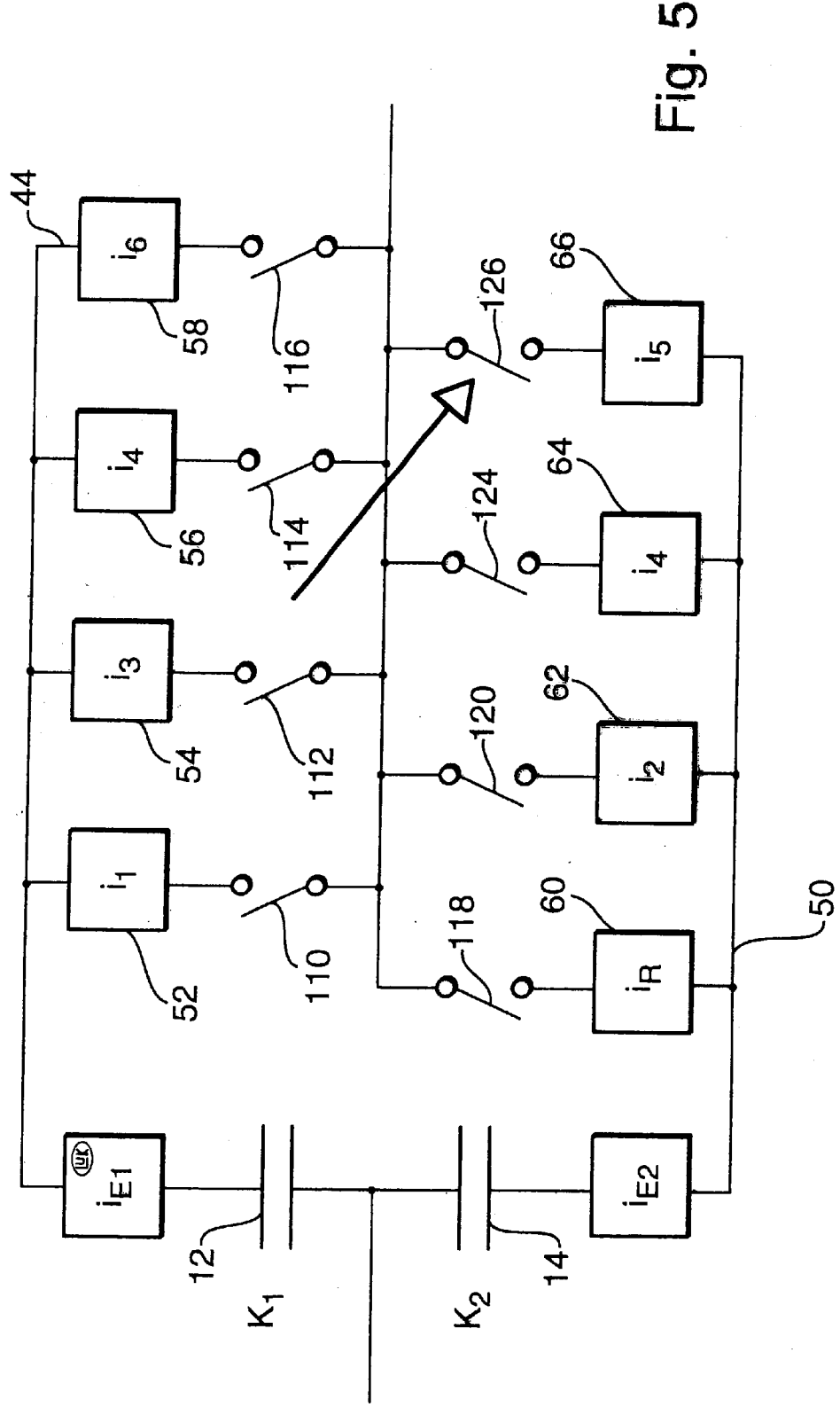
FIG. 5 shows a third view in which examples of shift processes are symbolised with respect to FIG. 2.

FIGS. 3 to 5 show similar to FIG. 2 examples of shifts which can be executed using a torque transfer device according to the invention. It should be noted that in the illustrations according to FIGS. 3 to 5 the third clutch devices can also be designed in particular like that shown in FIG. 1.

FIG. 3 shows in particular power shifts from first to second gear, from second to third gear, from third to fourth gear, from fourth to fifth gear as well as from fifth to sixth gear. The shifts from first to second, from second to third and from fifth to sixth gear are basically carried out as already explained for a shift from second to third gear. A power shift from third to fourth gear is carried out substantially initially in the same way. As soon as however the fourth gear is engaged between the second shaft and third shaft fourth gear is additionally shifted or engaged between the first shaft 46 and third shaft 18. The first clutch device 12 as well as the second clutch device 14 are in particular friction clutches. A mechanical blocking when both fourth gears are engaged need not be feared. The first 12 and second clutch device 14 are substantially closed if both fourth gears are engaged.

Irregularities can be compensated for example through the spring-damper mechanisms 36, 38.

To shift from fourth to fifth gear the second clutch device 14 and, preferably at the same time, the third clutch device 124 is opened through which the transmission stage 64 of fourth gear between the second shaft 50 and third shaft 18 was shifted. The second shaft 50 is then synchronised by means of the third clutch device 126 according to the transmission stage 66 of fifth gear and then, as already described above the claw clutch of the third clutch device 126 is closed. An overlapping shift from gear 4 to gear 5 is then carried out.

FIG. 4 shows an illustration substantially corresponding to that of FIG. 3 which shows the power shifts from second to fourth and from fourth to sixth gear.

First a shift is made from second gear or the transmission stage 62 substantially to fourth gear or transmission stage 56 which is mounted between the first shaft 46 and third shaft 18, as already illustrated above with regard to a shift from second to third gear. This is achieved by means of an overlapping shift. As soon as the third clutch device 114 is closed or as soon as the second clutch device 14 is opened the third clutch device 124 is closed whereby in particular synchronisation is carried out according to the description above. The second clutch device 14 is then closed again. To shift into sixth gear a first clutch device 12 is opened and the third clutch device 114 is opened. A shift is then carried out with overlapping shift which corresponds substantially to the shift process illustrated above with reference to a shift process from second to third gear.

FIG. 5 shows an illustration of a transmission device according to the invention which corresponds substantially to the illustration according to FIG. 2.

FIG. 5 shows in particular a power shift from third to fifth gear. This shift can be carried out according to the shift which is carried out above with regard to a shift from second to third gear.

Figure 6:
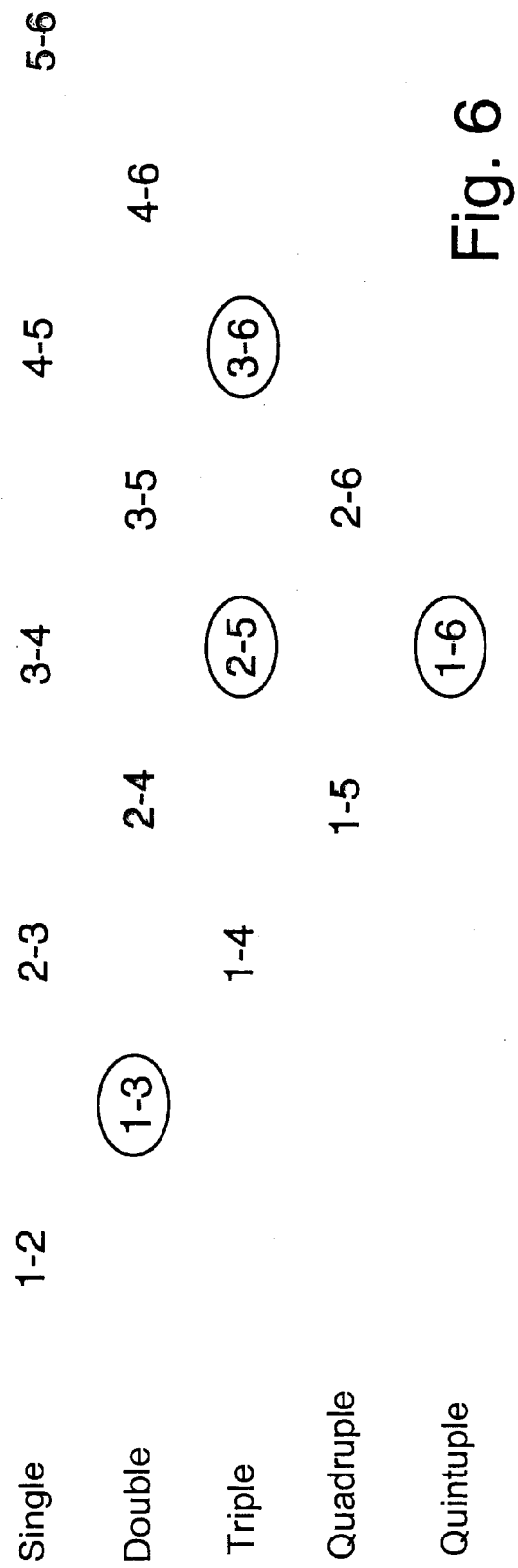
FIG. 6 shows in a table possible shift processes which can be shifted under load in an embodiment given by way of example in FIG. 1.

FIG. 6 shows diagrammatically different shift process of a 6-gear transmission wherein the link between two numbers indicates that a shift is carried out between the gears numbered by these numbers.

With a torque transfer device or double clutch transmission according to FIGS. 1 to 5 the shift processes which are not circled in FIG. 6 are shifted under load, whilst the shift processes which are circled, thus the double shift 1–3, and triple shifts 2–5 and 3–6 and the quintuple shift 1–6, in the embodiments according to FIGS. 1 to 5 are not carried out under load.

In FIG. 6 single means a shift is made into the next higher or next lower gear stage, double means that a shift is made directly two gear stages up or two gear stages down, triple means that a shift is made directly three gear stages up or down, quadruple that a shift is made directly four gear stages up or down and quintuple that a shift is made directly five gear stages up or down.

The invention is not to be restricted through the embodiments according to FIGS. 1 to 5 to the fact that predetermined shift processes, namely those circled in FIG. 6, cannot be shifted under load or with complete torque transfer through the torque transfer device.

Thus for example the shift 1–6 and 3–6 can be carried out with a torque transfer device 1 according to FIG. 1 in that in addition a transmission stage which has the transmission ratio allocated to the sixth gear or transmission stage 56 is arranged or can be shifted between the second shaft 50 and the third shaft 18.

The possibility of shifting from second gear directly into fifth gear or vice versa can be achieved in a torque transfer device according to one of FIGS. 1 to 5 in that a further transmission stage with a transmission ratio corresponding to the transmission ratio of the transmission stage 66 of the fifth gear is disposed between the fist shaft 46 and the third shaft 18. A shift from first to third gear under load can be carried out in a torque transfer device according to one of FIGS. 1 to 5 in that in addition a transmission stage is disposed between the second shaft 50 and the third shaft 18 whose transmission ratio corresponds substantially to that of the transmission stage 58 of the third gear.

Furthermore however a number of further possibilities exists with which a shift can be carried out under load between any predetermined gears with a double clutch transmission or in the case of several first or several second shafts triple clutch transmission or quadruple clutch transmission or a-times clutch transmission wherein a is a natural number which is greater than five.

FIGS. 7 to 11 show torque transfer devices or double clutch transmissions which correspond substantially to the embodiment according to FIG. 1. In the following the relevant differences are outlined in respect of FIG. 1 or between these embodiments according to FIGS. 7 to 11.

Figure 7:
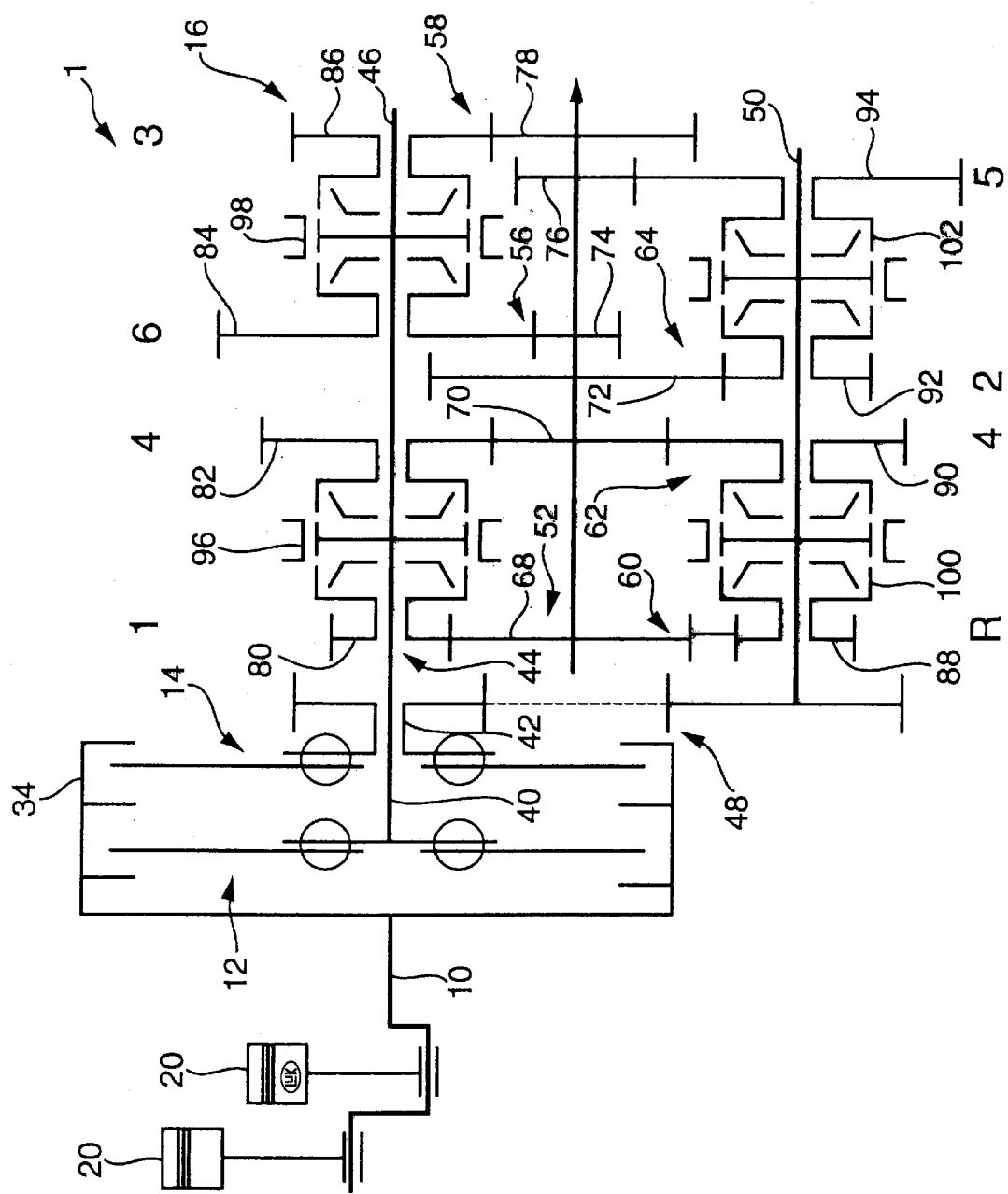
FIG. 7 shows in a diagrammatic part sectional view a second embodiment of the invention given by way of example.
Figure 8:
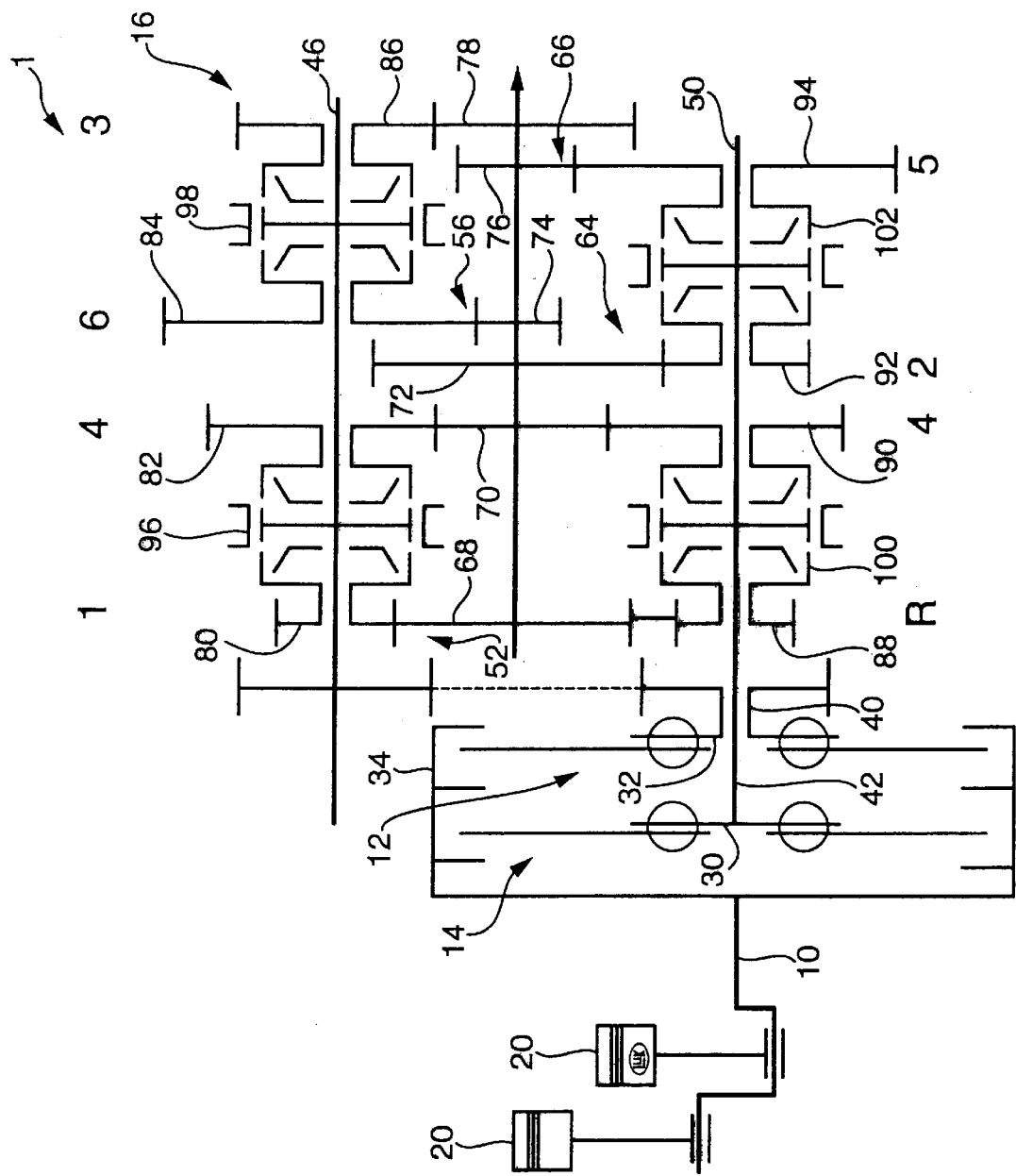
FIG. 8 shows in a diagrammatic part sectional view a third embodiment of the invention given by way of example.

The embodiment according to FIG. 7 differs from the embodiment according to FIG. 1 substantially in that in FIG. 7 the transmission ratios between the first gear input shaft 40 and the first shaft 46 and the second gear input shaft 42 and second shaft 50, respectively were selected differently. In FIG. 7 in particular the transmission ratio between the first gear input shaft 40 and the first shaft 46 is equal to 1:1, and the first gear input shaft and the first shaft in FIG. 7 is formed as a (one-piece) shaft respectively.

In the embodiment according to FIG. 7, differing from the embodiment according to FIG. 1, the third shaft 18 is aligned non-concentric with the first gear input shaft 40.

Furthermore the embodiment according to FIG. 7 differs from the embodiment according to FIG. 1 in that the transmission ratio between the second gear input shaft 42 and the second shaft 50 was selected differently from FIG. 1. The embodiment of the invention illustrated in FIG. 8 differs from the embodiment of the invention illustrated in FIG. 7 in that in FIG. 8 it is not the first shaft 46 but the second shaft 50 which is aligned concentric with the torque transfer. Furthermore in FIG. 8 the second clutch device 14 is mounted on the gearbox side of the first clutch device 12. Furthermore the illustration according to FIG. 8 differs from the illustration according to FIG. 7 in that the second gear input shaft 42 is mounted concentric inside the first gear input shaft 40. The first gear input shaft 40 is in FIG. 8 a hollow shaft.

Figure 9:
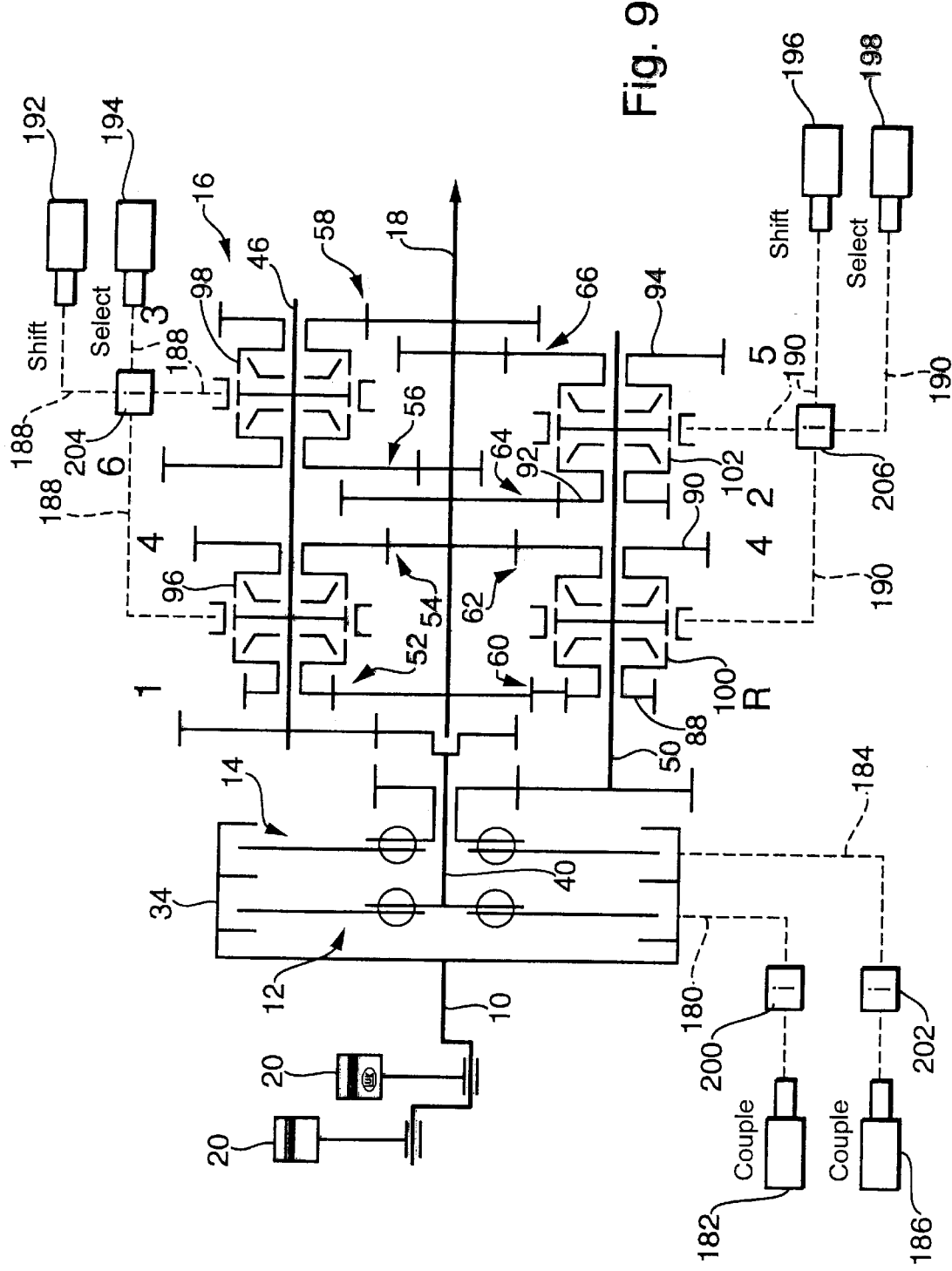
FIG. 9 shows in a diagrammatic part sectional view a fourth embodiment of the invention given by way of example.

In the embodiments according to FIG. 9, contrary to FIG. 1, there is in addition a first actuating device 180 with a drive device 182 for actuating the first clutch device 12, a second actuating device 184 with a second drive device 185 for actuating the second clutch device 14 as well as third actuating devices 188, 190 with third drive devices 192, 194, 196, 198.

The third actuating devices 180, 182, 188, 190 with third drive devices 182, 186, 192, 194, 196, 198 have transmission ratios 200, 202, 204, 206.

For shifting and for actuating the first clutch device 12 as well as the second clutch device 14 there are separate actuating devices 180 and 184 respectively each with a separate drive 182, 186. The third actuating devices 188, 190 are also substantially separate from each other and independent. The third actuating devices 188, 190 with third drive device 192, 194 and 196, 198 respectively are each designed similar or identical. The third actuating devices 188 and 190 each have an electric motor 194, 198 respectively which can move an engagement element so that this engagement element is shifted into a shift position from which it can be brought into engagement with a third clutch device 96, 98, 100 or 102 respectively or by which this relevant third clutch device can be shifted. This shift movement is produced each time by a shift motor or electric motor 192 or 196.

Figure 10:
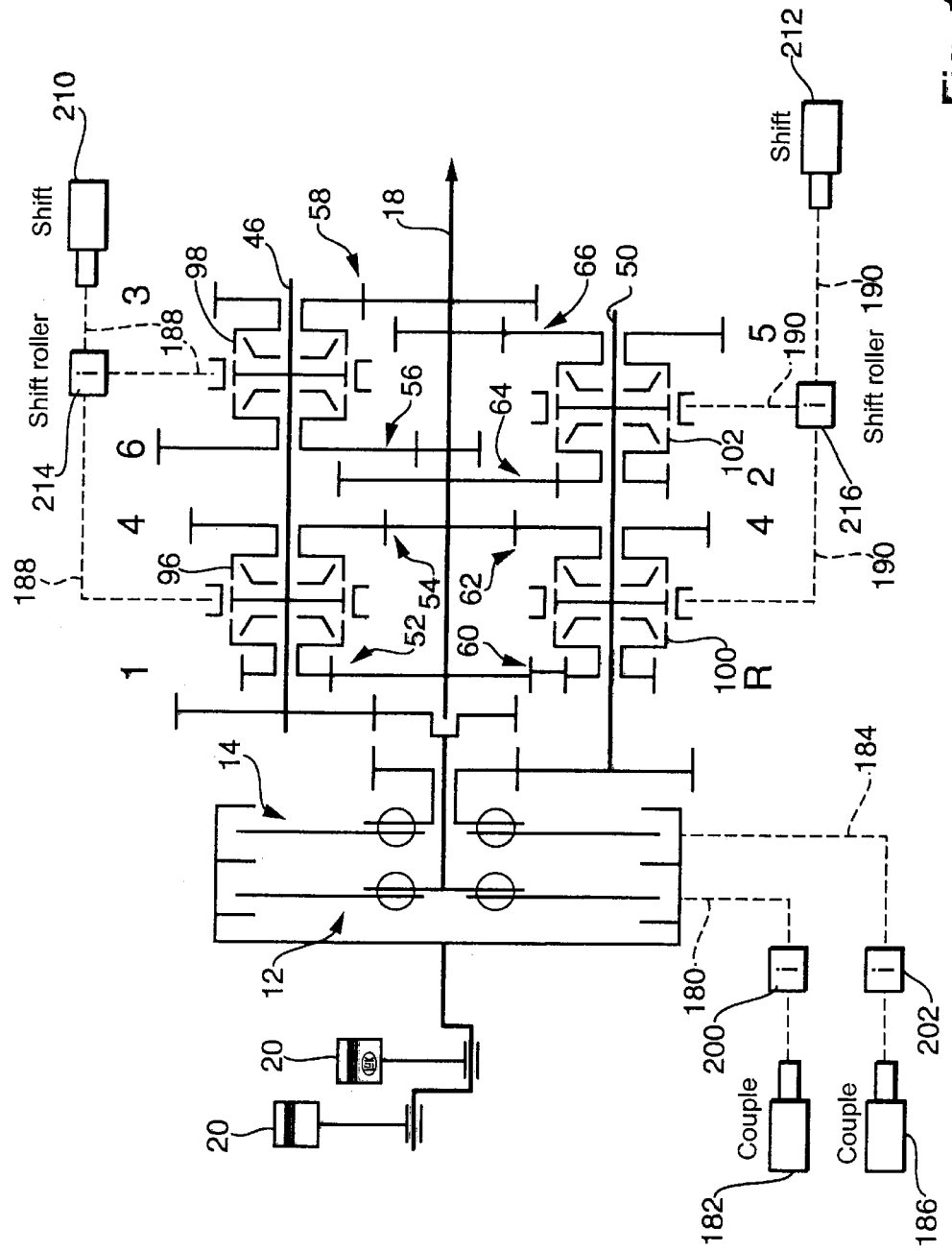
FIG. 10 shows in a diagrammatic part sectional view a fifth embodiment of the invention given by way of example.

FIG. 10 shows an embodiment by way of example of the invention which differs from the embodiment illustrated in FIG. 9 substantially through the third actuating devices 188, 190 and their drive devices 210, 212. Only one drive device 210 or 212 is provided for each first shaft 46 and each second shaft 50. This drive device biases a shift roller 214, 216 which where necessary each has a transmission stage. The third clutch devices 96, 98 are each actuated by means of the shift roller 214 whilst the third clutch devices 100, 102 are each actuated by means of the shift roller 216.

Figure 11:
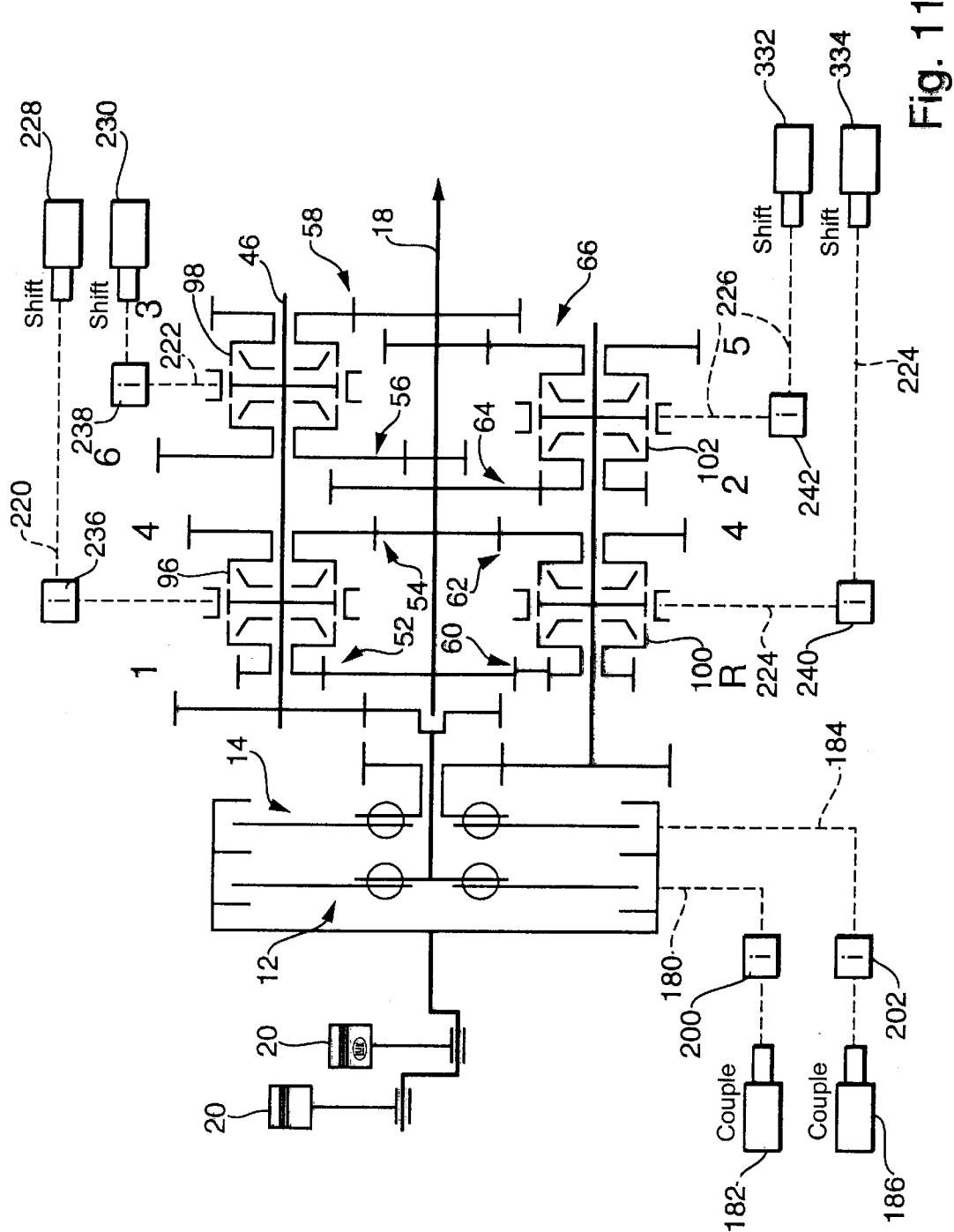
FIG. 11 shows in a diagrammatic part sectional view a sixth embodiment of the invention given by way of example.

The embodiment of the invention illustrated by way of example in FIG. 11 differs from the embodiments of the invention illustrated in FIGS. 9 and 10 substantially in that for each third clutch device 96, 98, 100, 102 there is an actuating device 220, 222, 224, 226 which each have a drive device 228, 230, 232, 234. Where necessary transmission ratios 236, 238, 240, 242 are provided inside the actuating devices 220, 222, 224, 226.

Figure 12:
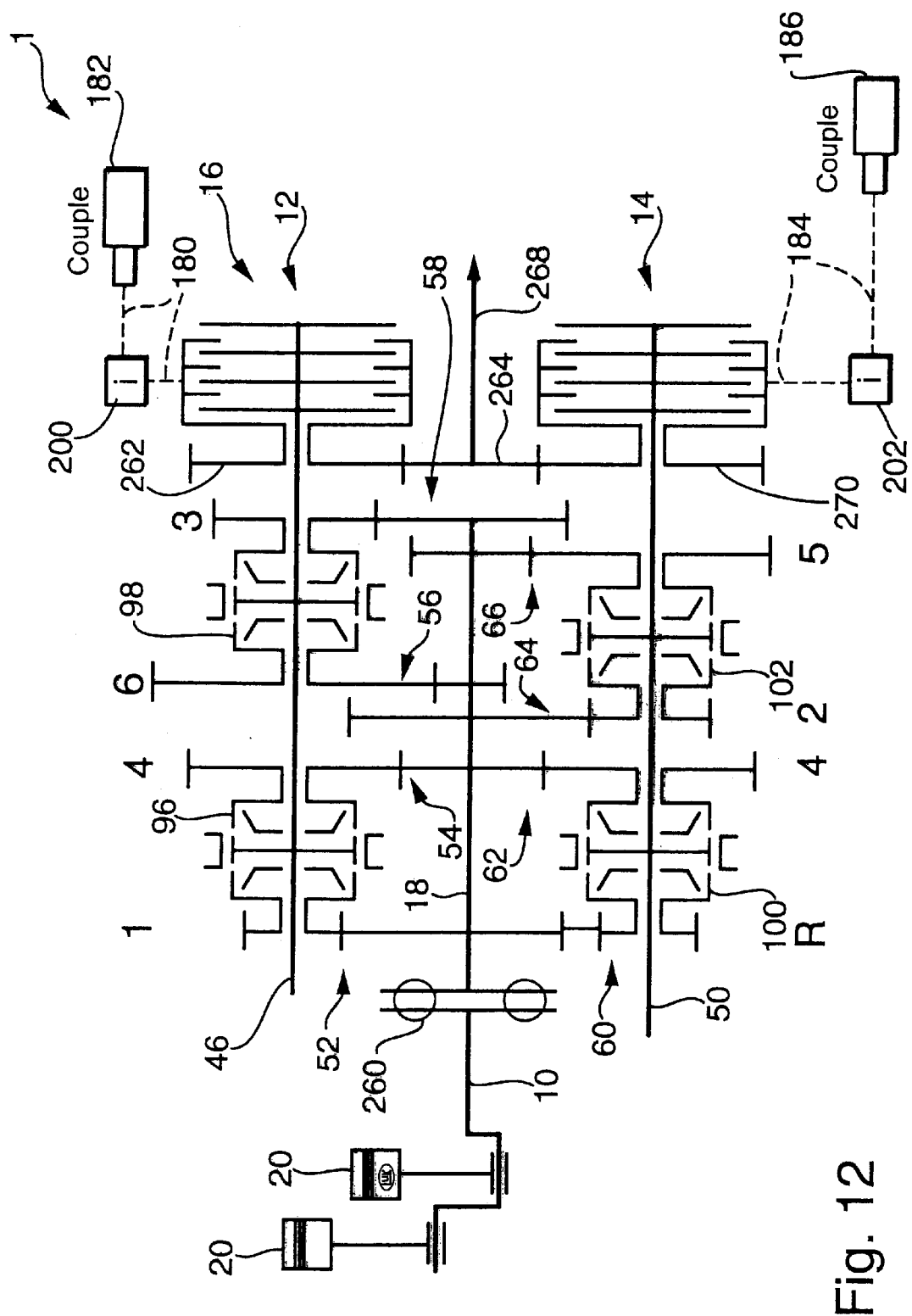
FIG. 12 shows in a diagrammatic part sectional view a seventh embodiment of the invention given by way of example.

The embodiment of the invention illustrated by way of example in FIG. 12 differs from that in FIG. 1 substantially in that the first clutch device 12 as well as the second clutch device 14 are mounted on the output side of the first shaft 46 and second shaft 50 respectively. Between the input shaft 10 of the torque transfer device 1 and the third shaft 18 there is a fourth clutch device 260 which is formed as a friction clutch and which can couple the input shaft 10 rotationally secured to the third shaft 18 or can uncouple these shafts 10, 18. Furthermore the fourth clutch device can be shifted into an intermediate stage in which this fourth clutch device 260 can transfer a predetermined restricted torque.

The third shaft 18 is disposed an the input side of the second shaft 46 and third shaft 50.

On the output side of the first shaft and second shaft there are the first 12 and second clutch devices 14 respectively which are multi-plate clutches and can be actuated by an actuating device 180, 184 with drive device 182, 186. The first clutch device 12 can couple a wheel 262, here a toothed wheel, mounted rotatable on the first shaft 46, rotationally secured to said first shaft 46. Where the wheel 262 is coupled to the first shaft 46 torque is transferred through this wheel to a wheel 264 of the gear output shaft 268.

In a corresponding manner the second clutch device can couple the wheel 270 mounted rotatable on the second shaft 50 rotationally secured to said second shaft 50 so that torque can be transferred through the wheels 270, 264 between the second shaft 50 and the gear output shaft 268.

The patent claims filed with the application are proposed wordings without prejudice for obtaining wider patent protection. The applicant retains the right to claim further features disclosed up until now only in the description and/or drawings.

References used in the sub-claims refer to further designs of the subject of the main claim through the features of each relevant sub-claim; they are not to be regarded as dispensing with obtaining an independent subject protection for the features of the sub-claims referred to.

Since the subjects of the sub-claims can form independent and proper inventions in respect of the prior art known on the priority date the applicant reserves the right to make them the subject of independent claims and partial declarations. They can also contain independent inventions which have a configuration independent of the subjects of the preceding sub-claims.

The embodiments are not to be regarded as a restriction of the invention. Rather within the scope of the present disclosure numerous modifications and amendments are possible, particularly those variations, elements and combinations and/or materials which e.g. through a combination or modification of individual features or elements or method steps described in connection with the general description and embodiments as well as claims and are contained in the drawings can be drawn on by the expert with a view to solving the problem posed by the invention and which through a combination of features lead to a new subject or new method steps or sequence of method steps, where they relate to manufacturing, test and work processes.

What is claimed is:

1. A torque transfer device comprising several shafts of which at least one shaft is a fourth shaft, being an input shaft, and at least one shaft is a third shaft, being an output shaft;

at least one transmission device which under predetermined conditions is at least in part in a transmission stretch between the at least one fourth shaft and a at least one third shaft and which can be shifted into different shift positions and with which several different transmission stages can be shifted between this at least one fourth shaft and this at least one third shaft;

wherein torque can be transferred during a shift process between different shift positions of the transmission device between the at least one fourth shaft and the at least one third shaft;

wherein the transmission device can be shifted into at least two different shift positions in which a transmission ratio between the at least one fourth shaft and the at least one third shaft is the same;

at least a first and at least a second clutch device;

wherein under predetermined conditions a transmission stage is shifted between a first shaft and the third shaft and at the same time a transmission stage is shifted between a second shaft and the third shaft whereby the transmission ratios of these transmission stages are substantially identical;

wherein the first and the second clutch device are substantially closed under predetermined conditions when the transmission ratio shifted between the first and third shaft agrees with the transmission ratio shifted between the second and third shaft.

2. A torque transfer device of claim 1 comprising wherein several of the transmission stages are configured so that under predetermined conditions in each of these relevant transmission stages a first identical rotational direction of the third shaft is produced, and wherein where necessary a further transmission stage is configured so that under these predetermined conditions in this transmission stage a second rotational direction of the third shaft is produced which is opposite the first rotational direction;

wherein the transmission stages which create the first rotational direction of the third shaft and differ through a transmission ratio or through relevant transmission chain overall transmission ratios associated therewith, are numbered with rising transmission ratio or with rising transmission train overall transmission ratio with progressive natural numbers, starting with the number one (gears); and wherein between the first shaft and third shaft and/or between the second shaft and third shaft at least one transmission stage can be shifted which is designated by an even number and one which is designated by an uneven number.

3. A torque transfer device of claim 1 wherein several of the transmission stages are designed so that under predetermined conditions in these relevant transmission stages a first rotational direction of the third shaft is produced which is the same each time and wherein if necessary a further transmission stage is designed so that under these predetermined conditions in this transmission stage a second rotational direction of the third shaft is produced which is opposite the first rotational direction;

wherein the transmission stages which cause the first rotational direction of the third shaft and differ through a transmission ratio are numbered with rising transmission ratio with progressive natural numbers, starting with the number one (gears); and wherein from at least one transmission stage which is marked by the natural number i a shift can be made both into the transmission stage marked by the number (i+1) and in the transmission stage marked by the number (i+2), and/or both into the transmission stage marked by the number (i−1) and into the transmission stage marked by the number (i−2) and wherein during these shift processes the torque transfer device transfers a torque.

4. A torque transfer device as defined in claim 2, wherein at least a transmission stage which can be shifted between the first shaft and third shaft can also be shifted between the second shaft and the third shaft.

5. A torque transfer device as defined in claim 1, wherein under predetermined conditions at least one transmission stage which can be shifted between the first shaft and the third shaft and at least one transmission stage which can be shifted between the second shaft and the third shaft produce the same direction of rotation of the third shaft.

6. A torque transfer device as defined in claim 1, further comprising at least a third clutch device.

7. A torque transfer device as defined in claim 1, wherein at least one wheel is disposed about the axle of at least one of the first, the second, the third and the fourth shafts, and the torque transfer device can transfer torque by means of at least one part of these wheels.

8. A torque transfer device as defined in claim 6, further comprising several third clutch devices.

9. A torque transfer device as defined in claim 6, wherein at least one wheel is mounted rotatable on the first or the second shaft.

10. A torque transfer device as defined in claim 6, wherein at least one of the third clutch devices can connect several wheels mounted rotatable on the first shaft or several wheels mounted rotatable on the second shaft, rotationally secured to the relevant shaft and can release this connection whereby this third clutch device is designed in particular so that it couples a maximum of one wheel at the same time to this shaft.

11. A torque transfer device as defined in claim 6, wherein at least one of the third clutch devices is a claw clutch.

12. A torque transfer device as defined in claim 6, wherein at least one of the third clutch devices has a synchronising device.

13. A torque transfer device as defined in claim 6, wherein the transmission device can be shifted into n transmission stages and (n−m) third clutch devices are provided wherein n and m are each natural numbers and wherein m=(n+1)/2 when n is an odd number and wherein m=(n+2)/2 when n is an even number.

14. A torque transfer device as defined in claim 6, wherein at least a part of the third clutch devices is shifted by at least a third actuating device into different shift positions.

15. A torque transfer device as defined in claim 14, wherein at least a part of the third actuating devices has at least a third drive device.

16. A torque transfer device as defined in claim 15, wherein at least one signal transmission stretch between a third drive device and the third clutch device loaded by this third drive device is identical at least in part with the signal transfer stretch between another third drive device and the other third clutch device loaded by this other third drive device wherein these third clutch devices which are associated with a common signal transfer stretch for each drive device are associated in particular with the same shaft.

17. A torque transfer device as defined in claim 15, wherein at least one signal transfer stretch between a third drive device and the third clutch device loaded by this third drive device differ at least in part more particularly entirely from the signal transfer stretch between another third drive device and the other third clutch device loaded by this other third drive device, wherein these third clutch devices which are associated at least in part with different signal transfer stretches for each drive device are associated in particular with the same shaft.

18. A torque transfer device as defined in claim 15, wherein at least a third clutch device which is associated with the first shaft is shifted or actuated independently of at least another third clutch device which is associated with the second shaft.

19. A torque transfer device as defined in claim 15, wherein precisely one third drive device which can load all of the third clutch devices associated with the first shaft, and exactly one other third drive device which can load all the third clutch devices which are associated with the second shaft.

20. A torque transfer device as defined in 15, wherein one third drive device is provided for each third clutch device.

21. A torque transfer device as defined in claim 15, wherein the third actuating device has at least one shift roller wherein more particularly just one shift roller is provided for actuating third clutch devices of the first shaft and just one shift roller is provided for actuating third clutches of the second shaft.

22. A torque transfer device as defined in claim 1, wherein torque can be transferred to at least one wheel of the third shaft by means of a wheel of the first shaft and by means of one wheel of the second shaft.

23. A torque transfer device as defined in claim 1, wherein torque can be transferred to at least one wheel of the third shaft at the same time by means of a wheel of the first shaft and by means of a wheel of the second shaft.

24. A torque transfer device as defined in claim 1, wherein torque can be transferred to at least one wheel of the third shaft by means of a wheel of the first shaft during a first time window and by means of a wheel of the second shaft during a second time window which is different from the first.

25. A torque transfer device as defined in claim 1, wherein at least one of the first and second clutch devices is a friction clutch.

26. A torque transfer device as defined in claim 1, wherein the first and second clutch device have a common clutch housing.

27. A torque transfer device as defined in claim 1, wherein the first clutch device in at least a first shift position transfers torque between a fifth shaft and one shaft and in at least a second shift position can transfer no torque between this fifth and this one shaft wherein the fifth shaft is crankshaft of a motor vehicle and the one shaft is one of the first or the second or the fourth shaft.

28. A torque transfer device as defined in claim 1, wherein at least one of the first and second clutch devices is mounted in the torque flow between the first shaft or the second shaft and a drive axle of a motor vehicle having the torque transfer device.

29. A torque transfer device as defined in claim 1, further comprising a first actuating device which actuates or shifts the first clutch device and a second actuating device which actuates or shifts the second clutch device.

30. A torque transfer device to claim 29, wherein in that the first actuating device has a first drive device and the second actuating device has a second drive device.

31. A torque transfer device as defined in claim 30, wherein at least one transmission stage is provided between the first drive device and the first clutch device loaded by same and/or between the second drive device and the second clutch device loaded by this second drive device.

32. A torque transfer device as defined in claim 1, wherein the first clutch device is shifted or actuated independently of the second clutch device.

33. A torque transfer device as defined in claim 1, wherein the first clutch device and the second clutch device transfer torque simultaneously under predetermined conditions.

34. A torque transfer device, as defined in claim 1, wherein the torque which can be transferred by the first clutch device and/or the torque which can be transferred by the second clutch device under predetermined conditions is restricted each time to a predetermined limit torque which can change where necessary.

35. A torque transfer device as defined in claim 1, causes under predetermined conditions an overlapping shift whereby during this overlapping shift the first and the second clutch device become increasingly closed and the other of these clutch devices becomes increasingly opened, wherein a least at times both clutch devices are closed at least in part so that a part of the torque introduced into the torque transfer device is transferred through the first clutch device and a part of the torque introduced into the torque transfer device is transferred through the second clutch device and wherein the torque transfer device transfers torque during this opening and closing.

36. A torque transfer device as defined in claim 35 directly before the overlapping shift transfers torque through the first clutch device and the first shaft, and immediately after the overlapping shift transfers torque through the second clutch device and the second shaft when during the overlapping shift the first clutch device is increasingly opened and the second clutch device is increasingly closed.

37. A torque transfer device as defined in claim 1, wherein during all the shift processes between different shift positions of the transmission device torque is transferred between a motor vehicle drive device, in the form of internal combustion engine, of a motor vehicle with torque transfer device, and at least one drive axle of this vehicle.

38. A torque transfer device as defined in claim 7, wherein in different shift positions of the transmission device the torque flow is transferred through different toothed wheels.

39. A torque transfer device comprising several shafts of which at least one shaft is a fourth shaft, being an input shaft, and at least one shaft is a third shaft, being an output shaft;

at least one transmission device which under predetermined conditions is at least in part in the transmission stretch between the at least one fourth shaft and a at least one third shaft and which can be shifted into different shift positions and with which several different transmission stages can be shifted between this at least one fourth shaft and this at least one third shaft;

wherein torque can be transferred during a shift process between different shift positions of the transmission device between the at least one fourth shaft and the at least one third shaft;

wherein the transmission device can be shifted into at least two different shift positions in which a transmission ratio between the at least one fourth shaft and the at least one third shaft is the same;

at least a first and at least a second clutch device;

wherein the first clutch device in at least a first shift position transfers torque between a fifth shaft and one shaft and in at least a second shift position can transfer no torque between this fifth and this one shaft wherein the fifth shaft is a crankshaft of a motor vehicle and the one shaft is one of the first or the second or the fourth shaft;

wherein at least one transmission stage is provided between the crankshaft of a motor vehicle with torque transfer device and at least one of the first and second shafts.

* * * * *